US012595687B2

(12) United States Patent
Sims

(10) Patent No.: US 12,595,687 B2
(45) Date of Patent: Apr. 7, 2026

(54) PANIC BAR LATCH SYSTEM AND METHOD

(71) Applicant: Toby Jack Sims, Krum, TX (US)

(72) Inventor: Toby Jack Sims, Krum, TX (US)

( * ) Notice: Subject to any disclaimer, the term of this patent is extended or adjusted under 35 U.S.C. 154(b) by 107 days.

(21) Appl. No.: 18/825,373

(22) Filed: Sep. 5, 2024

(65) Prior Publication Data

US 2026/0062962 A1 Mar. 5, 2026

(51) Int. Cl.
*E05B 65/10* (2006.01)

(52) U.S. Cl.
CPC ...... *E05B 65/1093* (2013.01); *E05B 65/1046* (2013.01)

(58) Field of Classification Search
CPC ......................... E05B 65/1093; E05B 65/1046
See application file for complete search history.

(56) References Cited

U.S. PATENT DOCUMENTS 8,915,523 B2 * 12/2014 Tillman .............. E05B 65/1093 70/92
2006/0076786 A1 * 4/2006 Shaygan ............... E05C 19/184 292/288
2008/0106104 A1 * 5/2008 Lin ..................... E05B 63/0065 292/92
2008/0127458 A1 * 6/2008 Ramsauer ............. E05B 1/0015 16/412
2008/0169655 A1 * 7/2008 Gomez Gonzalez ........................ E05B 15/102 292/81
2011/0187131 A1 * 8/2011 Ploskunak ............ E05C 19/182 292/164
2013/0270843 A1 * 10/2013 Ploskunak ............ E05C 19/184 292/288
2014/0084605 A1 * 3/2014 Packer .................... E05C 17/54 292/343
2014/0175814 A1 * 6/2014 Holsopple ............... E05B 13/04 292/348
2014/0183883 A1 * 7/2014 Millsap ................... E05C 17/54 292/288
2014/0225385 A1 * 8/2014 Millsap ................. E05C 17/025 292/288
2015/0096149 A1 * 4/2015 Chang .................. E05B 1/0015 16/412
2021/0372166 A1 * 12/2021 Harris ................... E05C 19/003

* cited by examiner

*Primary Examiner* — Mark A Williams
(74) *Attorney, Agent, or Firm* — Kevin Mark Klughart

(57) ABSTRACT

A panic bar latch (PBL) system and method is disclosed that provides for the temporary functional disablement of a panic bar assembly (PBA) that controls passage through a door and associated door frame. The PBL system utilizes a panic latch handle (PLH) coupled to a panic latch body (PLB). The PLB incorporates a panic latch void (PLV) that is configured to mechanically conform and couple (MCC) to a panic bar base (PBB) on a PBA via a panic bar ridge (PBR) located on the PBB. A panic latch edge (PLE) on the PLB rests on the PPB when the MCC is engaged. The MCC prevents the PPB from being depressed or released by maintaining a fixed separation between the PPB and the PBB.

20 Claims, 32 Drawing Sheets

0400

0700

0900

1200

1500

PRIOR ART

PANIC BAR LATCH SYSTEM AND METHOD

CROSS REFERENCE TO RELATED APPLICATIONS

Not Applicable

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to panic bar systems and methods that are designed to promote easy egress through doors and door frames from buildings and other structures for a horizontally activated door latch by providing disengagement mechanism located on a door that is attached to a door frame. The present invention relates to an enhancement to these systems and methods that allow the panic push bar (PPB) within the panic bar assembly (PBA) that controls door latch operation to be immobilized and prevent entry/exit through the door in the event of a terrorist event or other building security event.

PRIOR ART AND BACKGROUND OF THE INVENTION

Commercial buildings are required to have emergency exit doors that are easy to open from the inside during an emergency evacuation. Two types of devices commonly used for this purpose are panic bars and crash bars. While these terms are often used interchangeably, there are significant differences between them in terms of design, function, and code requirements.

Panic bars (also known as push bars or exit devices) are horizontal bars that are installed on the inside of the door and are designed to be pushed to release the latch and open the door. They are used primarily in emergency exit doors and are required by building codes to ensure safe egress during an emergency evacuation. Panic bars are typically operated by pushing the bar in the direction of the exit, which releases the door latch and allows the door to swing open. They are easy to operate, even by people who are not familiar with the building's layout, and do not require any special knowledge or training to use. Examples of these types of devices are generally illustrated in FIG. 21 (2100)-FIG. 24 (2400).

Crash bars (also known as crossbars or touchbars) are vertical bars that are installed on the inside of the door and are designed to be pushed to release the latch and open the door. Unlike panic bars, which are designed to be pushed horizontally, crash bars are designed to be pushed vertically or at an angle. They are used primarily in high-traffic areas such as airports, hospitals, and supermarkets, where people may be carrying bulky items or pushing carts. Crash bars are designed to withstand high-impact collisions without causing injury to the user, hence the name "crash bar."

Crash bars may include mechanisms to fix the position of the bar and thus LOCK the door in which the crash bar is attached. Similar locking features may not be incorporated in panic bars, and thus it may be possible to break a window in the door and push a panic bar by reaching through a window and thus opening a door equipped with a panic bar. In some circumstances involving a terrorist attack or other security breach of a building, it would be useful to provide a portable latching mechanism for panic bars to allow the door to which they are attached to be held in a locked position without the possibility of override by an outside hostile entity.

Building codes do not permit the use of padlocks or any mechanism that requires a key to temporarily disable a panic bar or other mechanism used to control egress from a building. As a result, conventional methodologies of temporarily disabling a panic bar assembly (PBA) are unavailable for use in temporarily disabling the PBA in the event of a terrorist attack or other building security event that requires temporary lockdown of building doors and other entrypoints. As such, to date there is no known panic bar portable latching mechanism in the door lock industry that provides for a temporary or semi-permanent disablement of the panic bar in cases of a terrorist attack or other attack on building security by a hostile entity.

OBJECTIVES OF THE INVENTION

Accordingly, the objectives of the present invention are (among others) to circumvent the deficiencies in the prior art and affect the following objectives:

(1) Provide for a panic bar latch that is portable.

(2) Provide for a panic bar latch that may be easily installed.

(3) Provide for a panic bar latch that may be used across a variety of panic bar constructions.

(4) Provide for a panic bar latch that may be easily stored proximal to a panic bar.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention as generally depicted in FIG. 1 (0100) provides for a panic bar latch (PBL) that disables operation of a panic bar assembly (PBA) by forcing separation of a panic push bar (PPB) from a panic bar base (PBB) in the panic bar assembly (PBA). This forced separation of the PPB from the PBB prevents operation of the PBA and forces a locked condition on the door to which the PBA is attached.

The present invention incorporates a panic latch base (PLB) coupled with a panic latch handle (PLH). The PLB comprises a panic latch void (PLV) that mechanically engages a panic bar base (PBB) in the PBA via a panic bar ridge (PBR) located on the PBB and prevents the PPB from being depressed or released by maintaining a fixed separation between the PPB and the PBB. This mechanical engagement may occur using an upper PBR or a lower PBR that may be symmetrically located on the PBB. The PBL may be configured with multiple PLV having different void profiles so as to enable mechanical coupling of the PBL with a variety of PBR ridge profiles.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
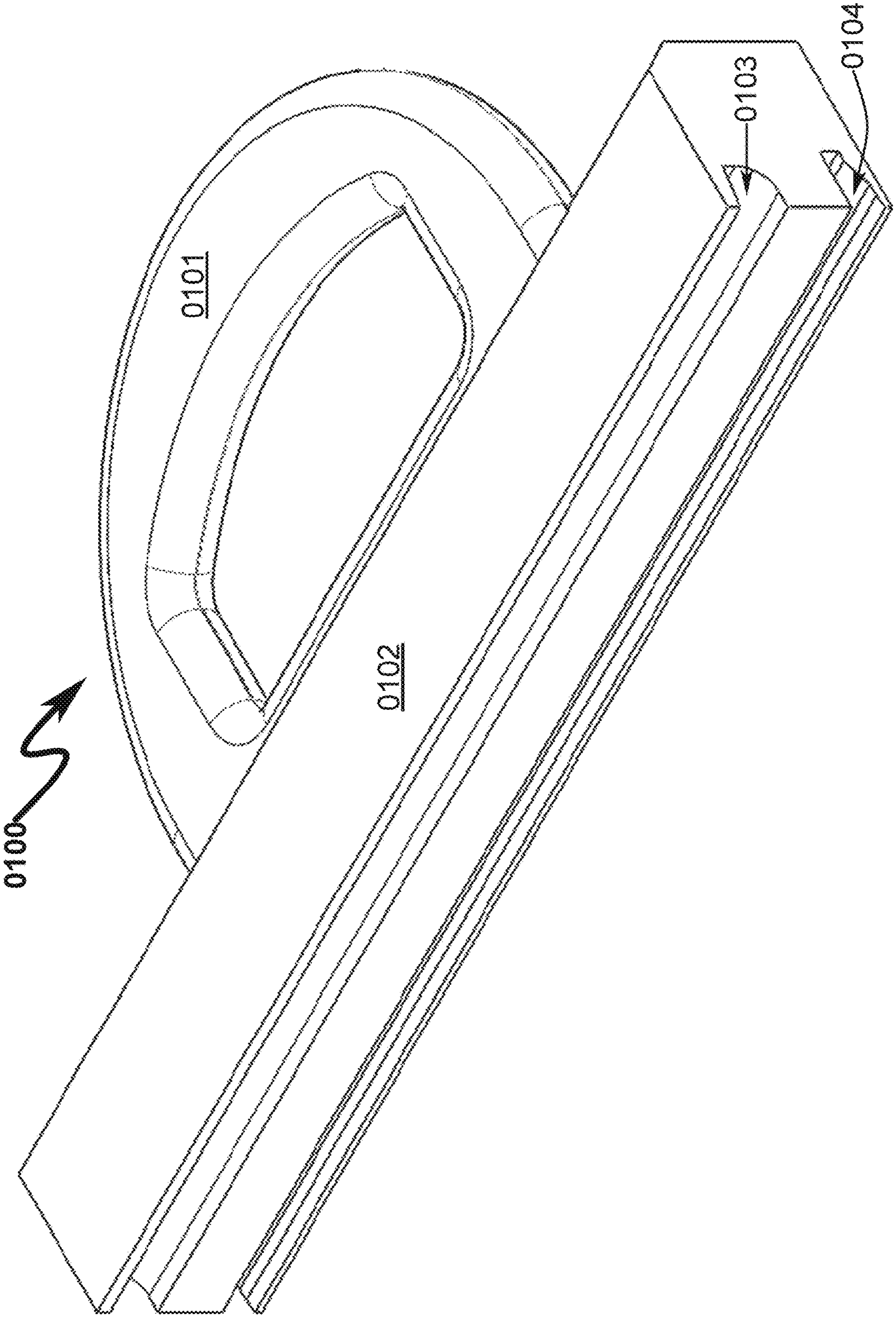
FIG. 1 illustrates a system diagram describing a preferred exemplary system embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a PANIC BAR LATCH SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Application to Counter Terrorism

The present invention has direct application to counter terrorism efforts as it provides for a code compliant method of sealing and securing doors to buildings in the event of an armed assault by terrorists or other acts of violence. Normal code compliance requires that all exits to a building be open for egress in the event of an emergency. However, in situations where a terrorist or other bad actor attempts to enter a building using a door equipped with a panic bar, there exists a risk that the panic bar may be activated from outside the building by breaking glass windows in the door and activating the panic bar from outside the building.

The present invention prevents this by allowing the panic bar to be locked in place thus preventing the door from being opened even if the door glass is removed. Additionally, since the present invention may be installed above or below the panic bar assembly (PBA), it may be installed below the PBA and thus out of reach of an external actor who has broken the door glass. As a result of this configuration, it is possible to maintain a door lock by deactivating the panic bar assembly (PBA) using the present invention even in circumstances where the door integrity has been compromised.

Construction Materials Not Limitive

The present invention may be constructed using a variety of materials, with preferred embodiments constructed of nylon (polyamide fibers that contain 0.11 polyamide); polyamide; polyoxymethylene (POM); acetal resin; and plastic.

Panic Latch Vold (PL) Not Limitive

While many configurations of the panic latch void (PLV) within the panic latch body (PLB) are anticipated, several void forms are preferred as they provide for optimal mating between the PLV and the panic bar ridge (PBR), thus ensuring a secure connection between the PBL and the panic push bar (PPB) on the panic push bar assembly (PBA). While not limitive, preferred PLV are formed using peripheral panic latch edges (PLE) comprising lines, peripheral edges comprising arcs, and/or peripheral edges comprising lines and arcs. As an example of these possible forms, detail provided in FIG. 5 (0500) illustrates PLV formed using peripheral PLE edges comprising lines (0503) and PLV formed using peripheral edges comprising lines and arcs (0504).

Panic Latch Edge (PLE) Not Limitive

While many configurations of the panic latch edge (PLE) within the panic latch body (PLB) are anticipated, several edge forms are preferred as they provide for optimal mating between the PLB and the panic push bar (PPB) of the panic bar assembly (PBA). While not limitive, preferred PLE are formed using one or more peripheral edges comprising lines. As an example of these possible forms, detail provided in FIG. 5 (0500) illustrates PLE formed using peripheral edges comprising a single line (0505) and PLE formed using multiple peripheral edges comprising lines (0506, 0507).

System Overview (0100)

FIG. 1 (0100)) depicts a general overview of construction of a preferred exemplary system embodiment of the present invention. The panic bar latch (PBL) system as depicted in FIG. 1 (0100) a panic latch handle (PLH) (0101) coupled to a panic latch body (PLB) (0102). The PLB (0102) incorporates one or more panic latch voids (PLV) (0103, 0104, 0503, 0504) that are configured to mechanically conform and couple (MCC) to a panic push bar (PPB) on a panic push bar assembly (PBA) via a panic bar ridge (PBR) located on the PPB that corresponds to the outline(s) of the PLV (0103, 0104, 0503, 0504). The MCC prevents the PPB from being depressed or released by maintaining a fixed separation between the PPB and the panic bar frame (PPF) of the PBA. The MCC may occur using either an upper PBR or a lower PBR located on the PPB. The PBL may be configured with multiple PLV (0103, 0104, 0503, 0504) having different void profiles so as to enable MCC of the PBL with a variety of PBR ridge profiles.

Exemplary PPB-to-PBB Separation

Figure 5:
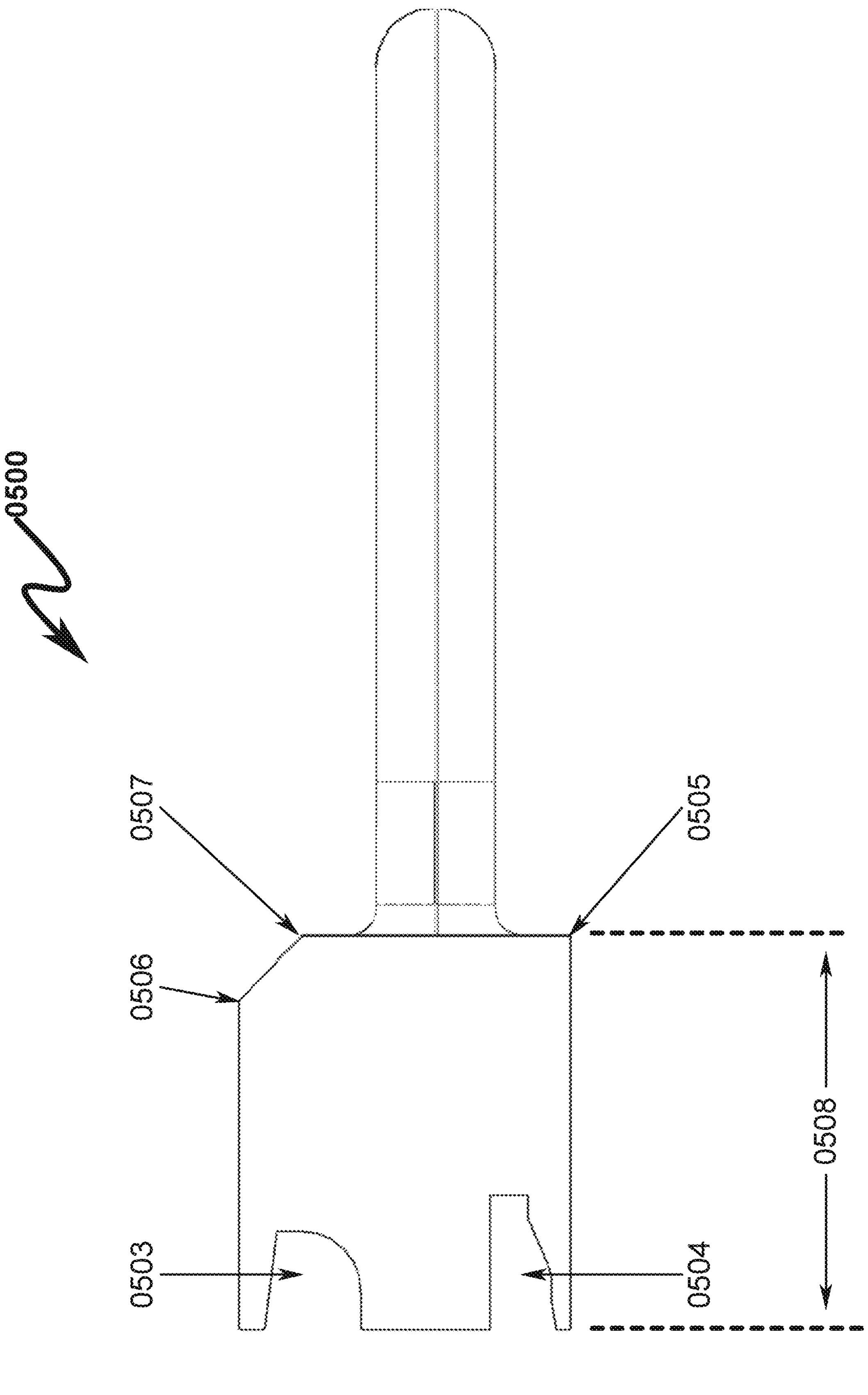
FIG. 5 illustrates a left side view of a preferred exemplary invention embodiment depicting exemplary PLV and PLE implementations.
Figure 6:
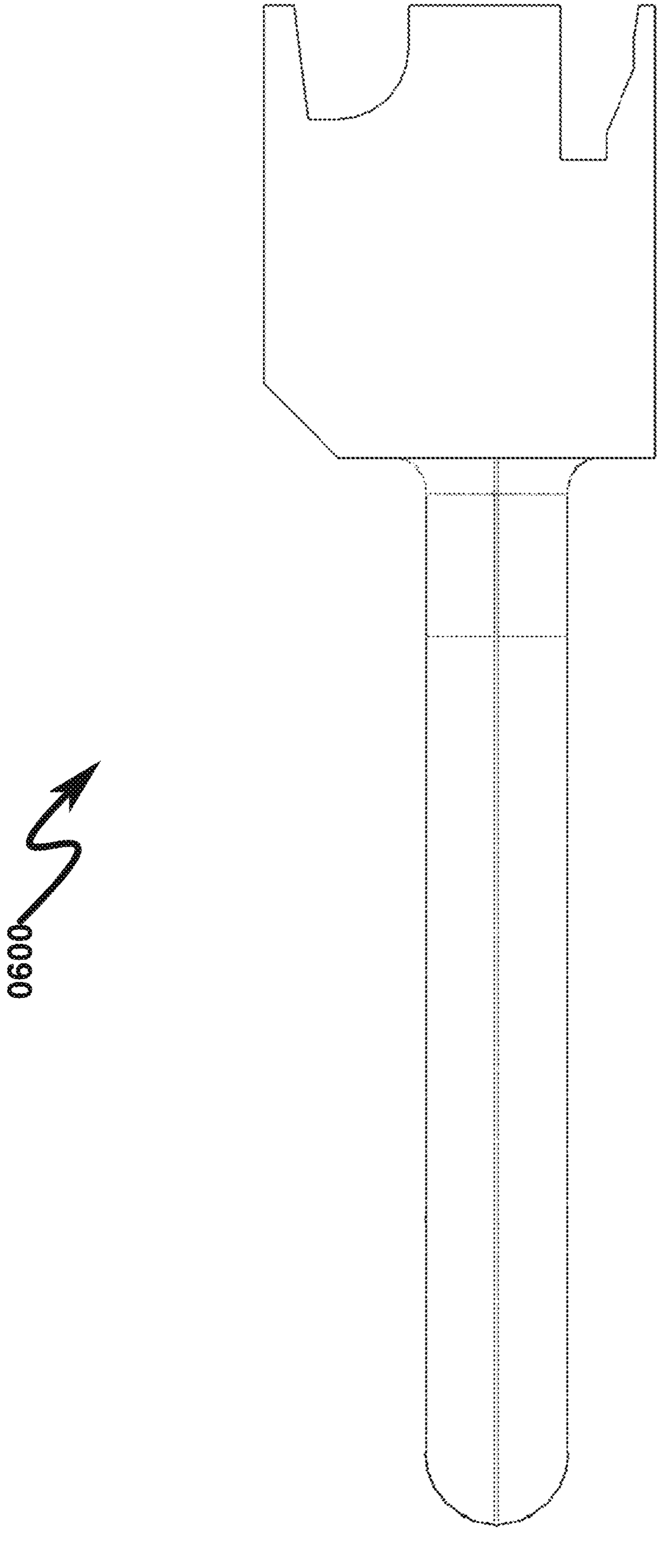
FIG. 6 illustrates a right side view of a preferred exemplary invention embodiment.
Figure 7:
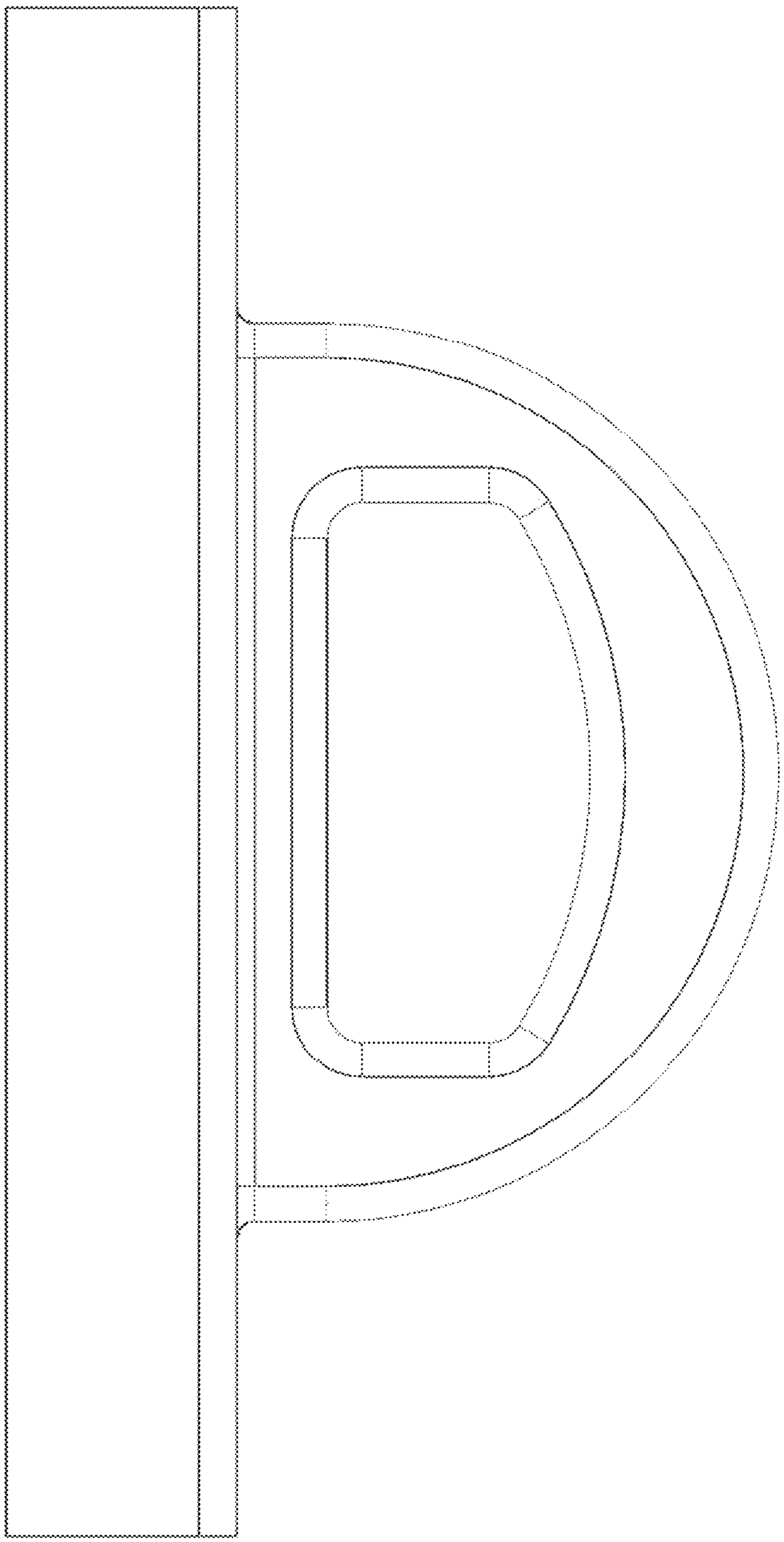
FIG. 7 illustrates a top view of a preferred exemplary invention embodiment.
Figure 8:
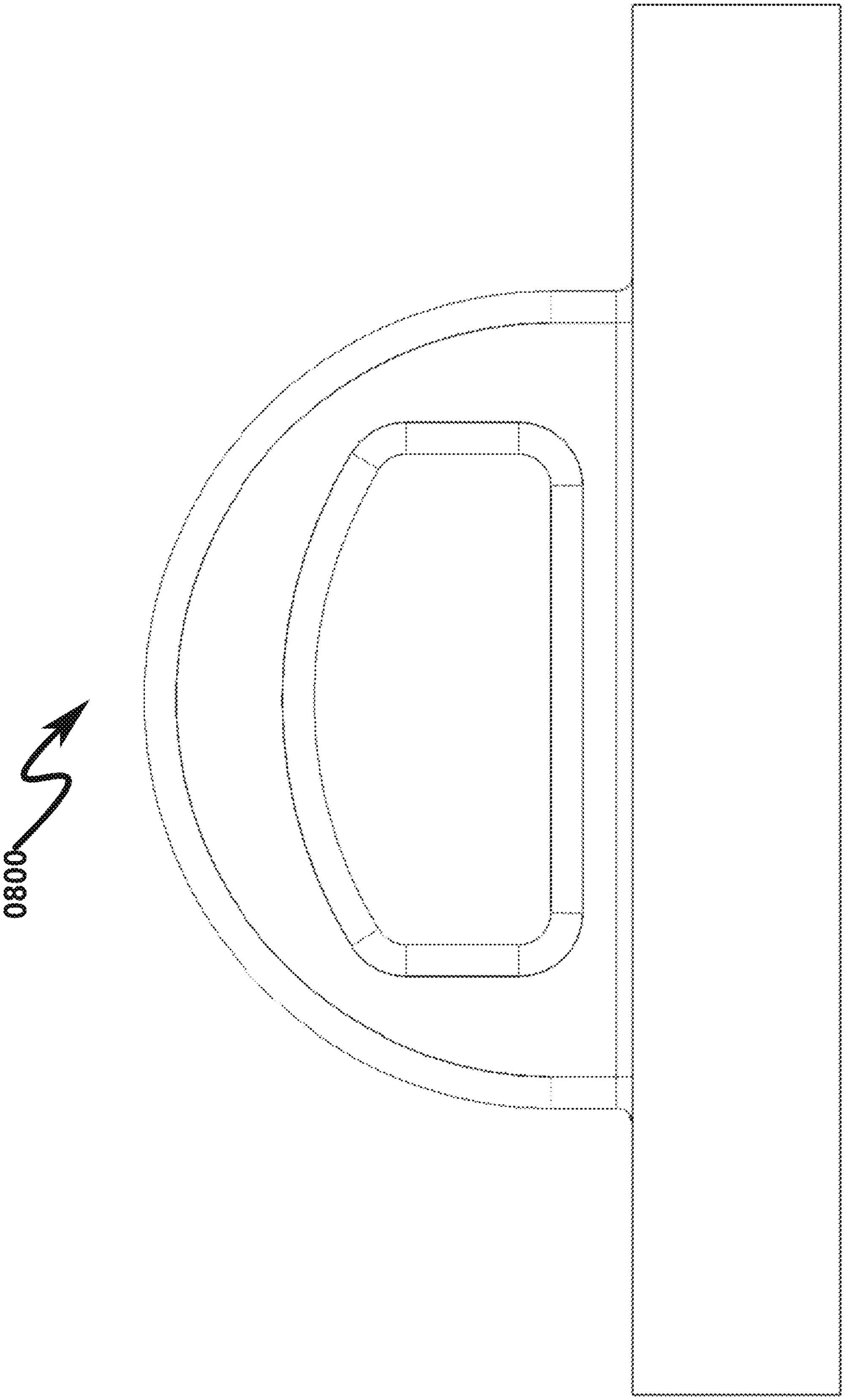
FIG. 8 illustrates a bottom view of a preferred exemplary invention embodiment.
Figure 9:
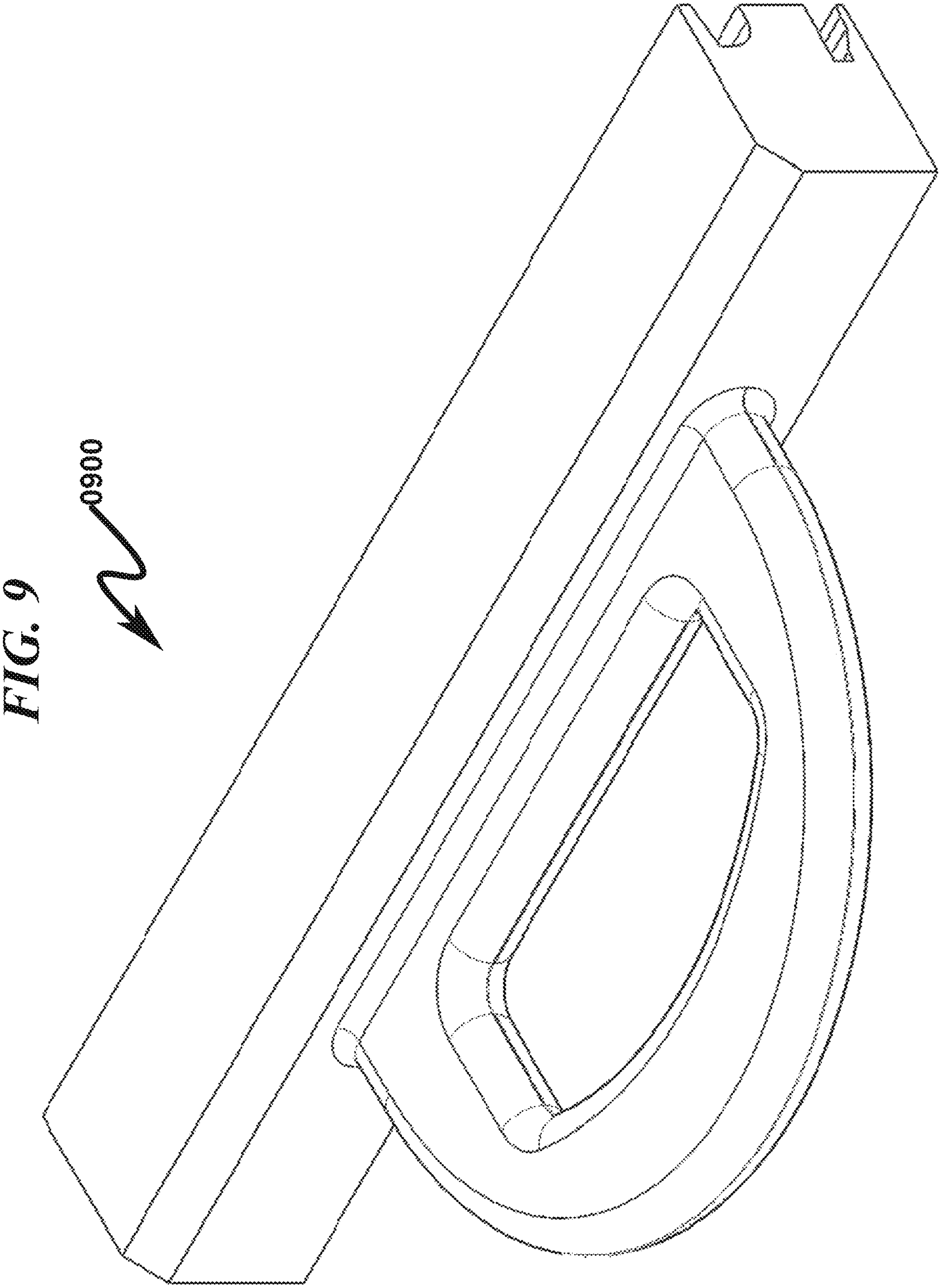
FIG. 9 illustrates a top right front perspective view of a preferred exemplary invention embodiment.
Figure 10:
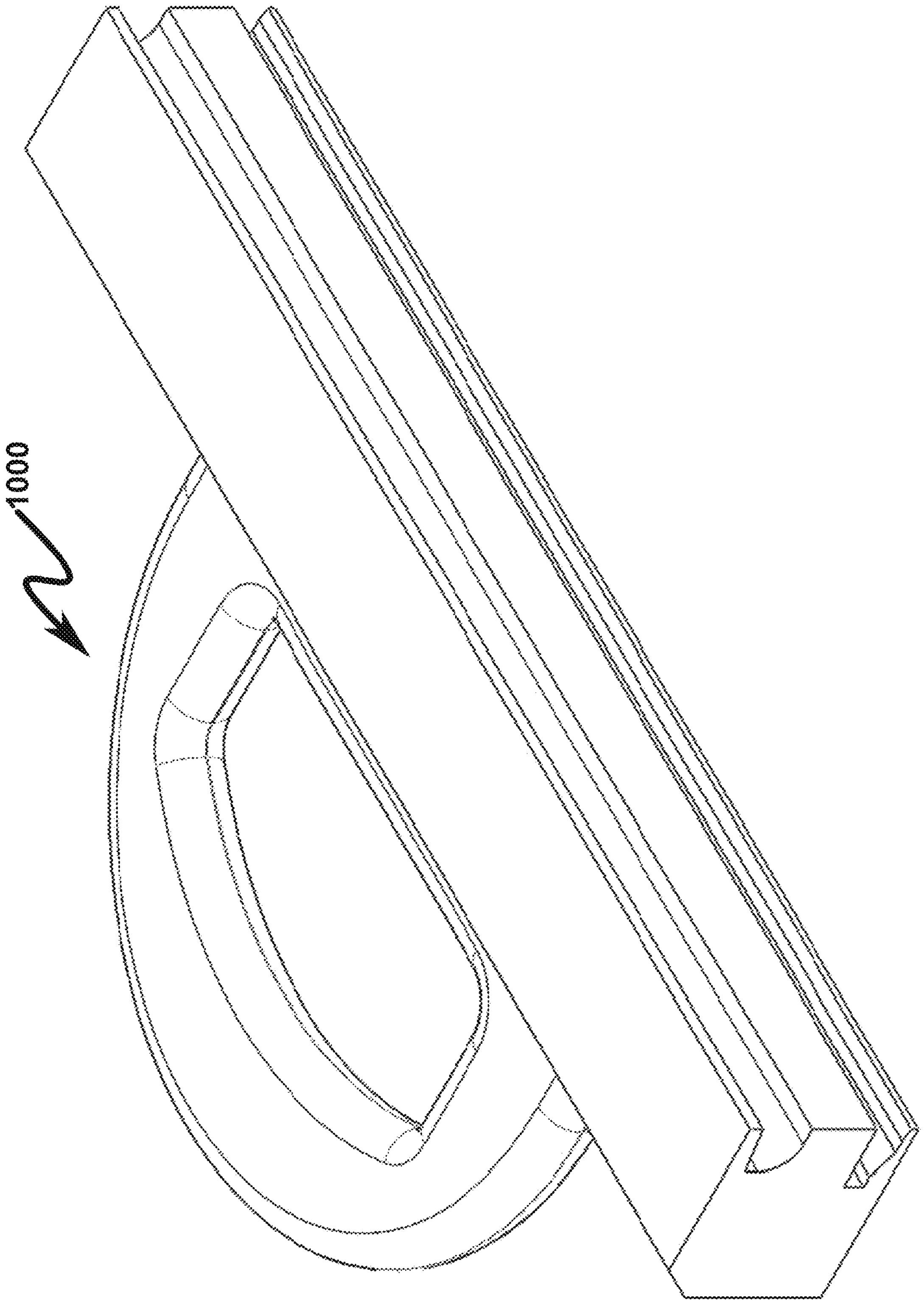
FIG. 10 illustrates a top right rear perspective view of a preferred exemplary invention embodiment.
Figure 11:
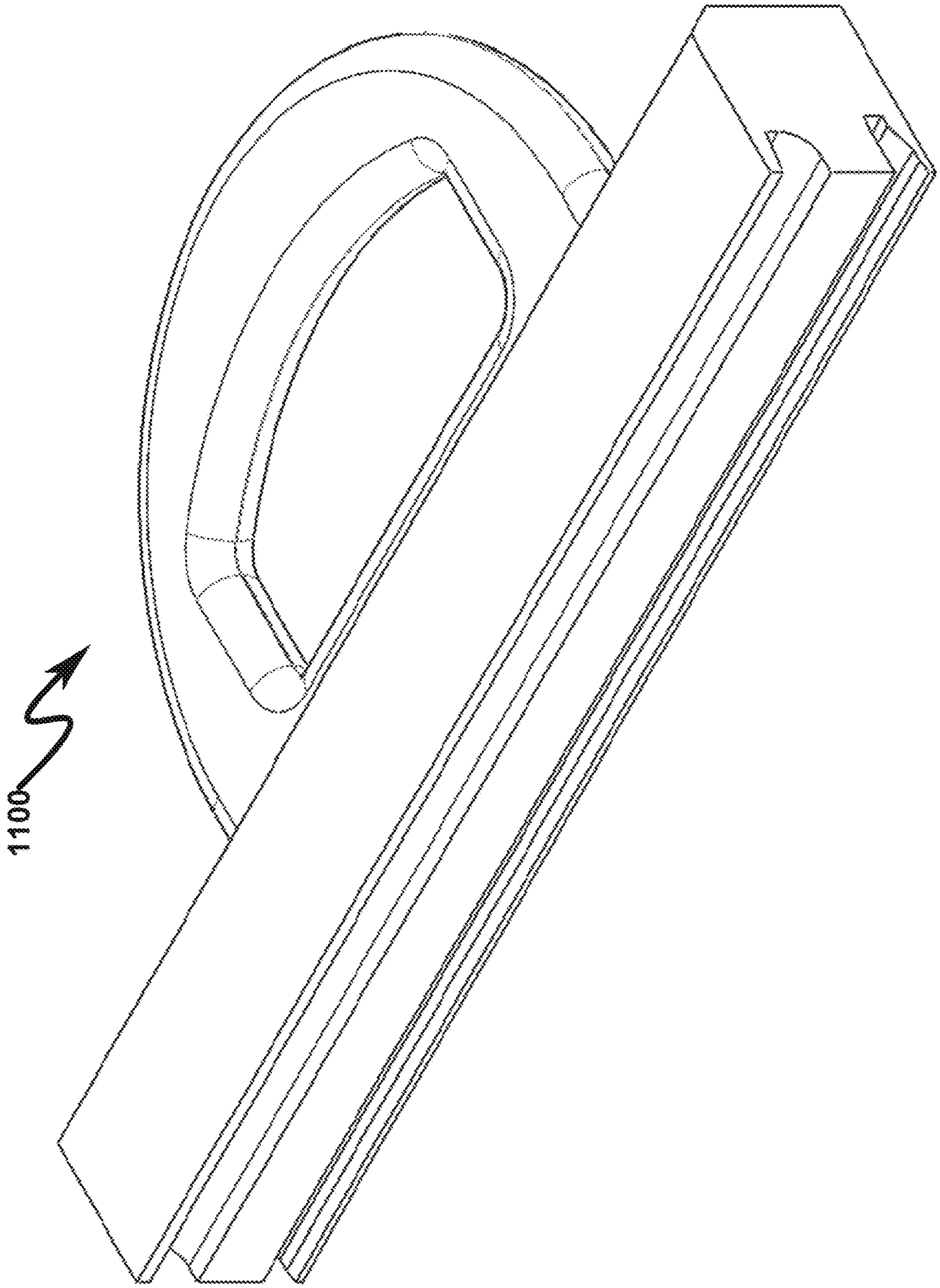
FIG. 11 illustrates a top left rear perspective view of a preferred exemplary invention embodiment.
Figure 12:
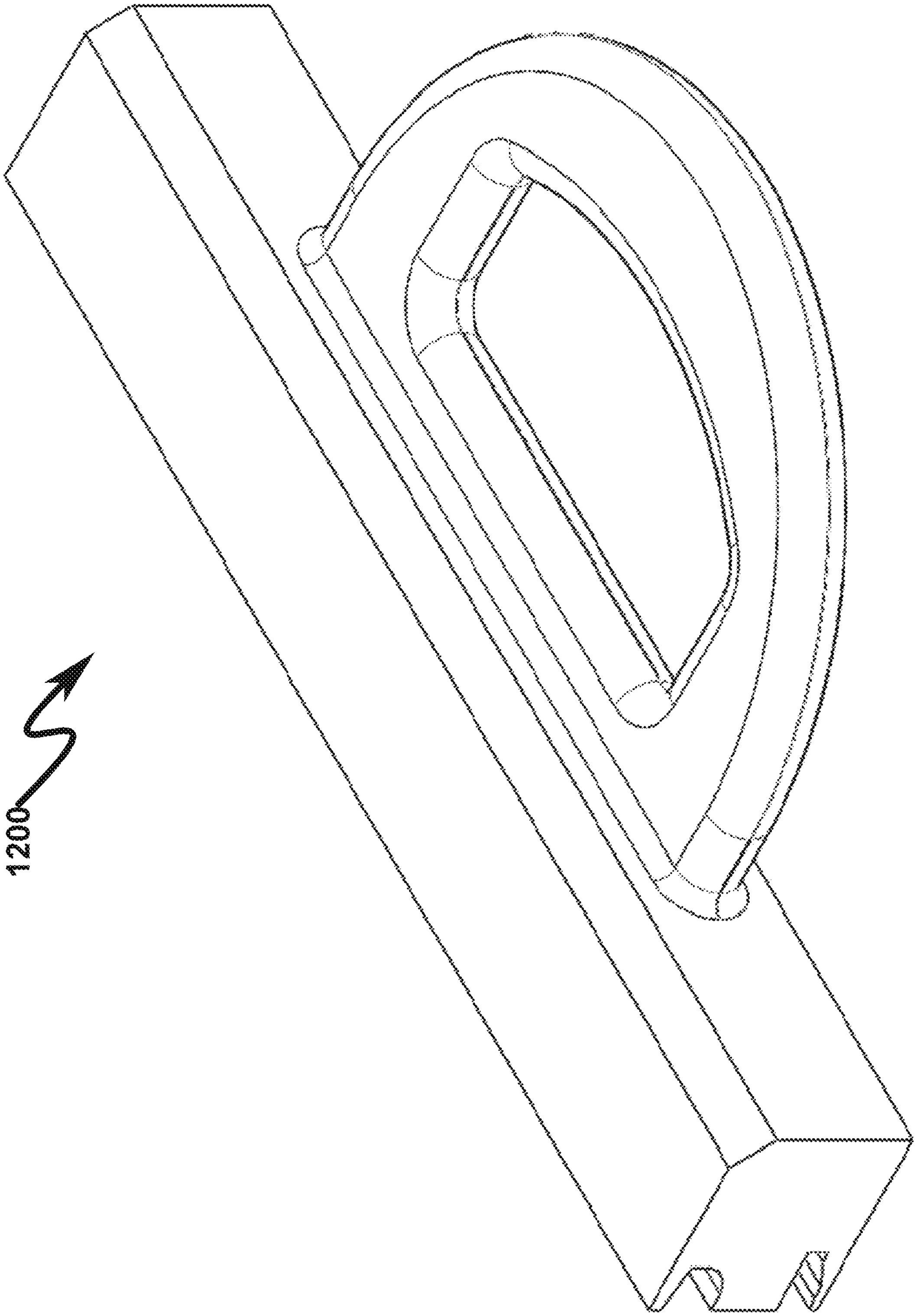
FIG. 12 illustrates a top left front perspective view of a preferred exemplary invention embodiment.
Figure 13:
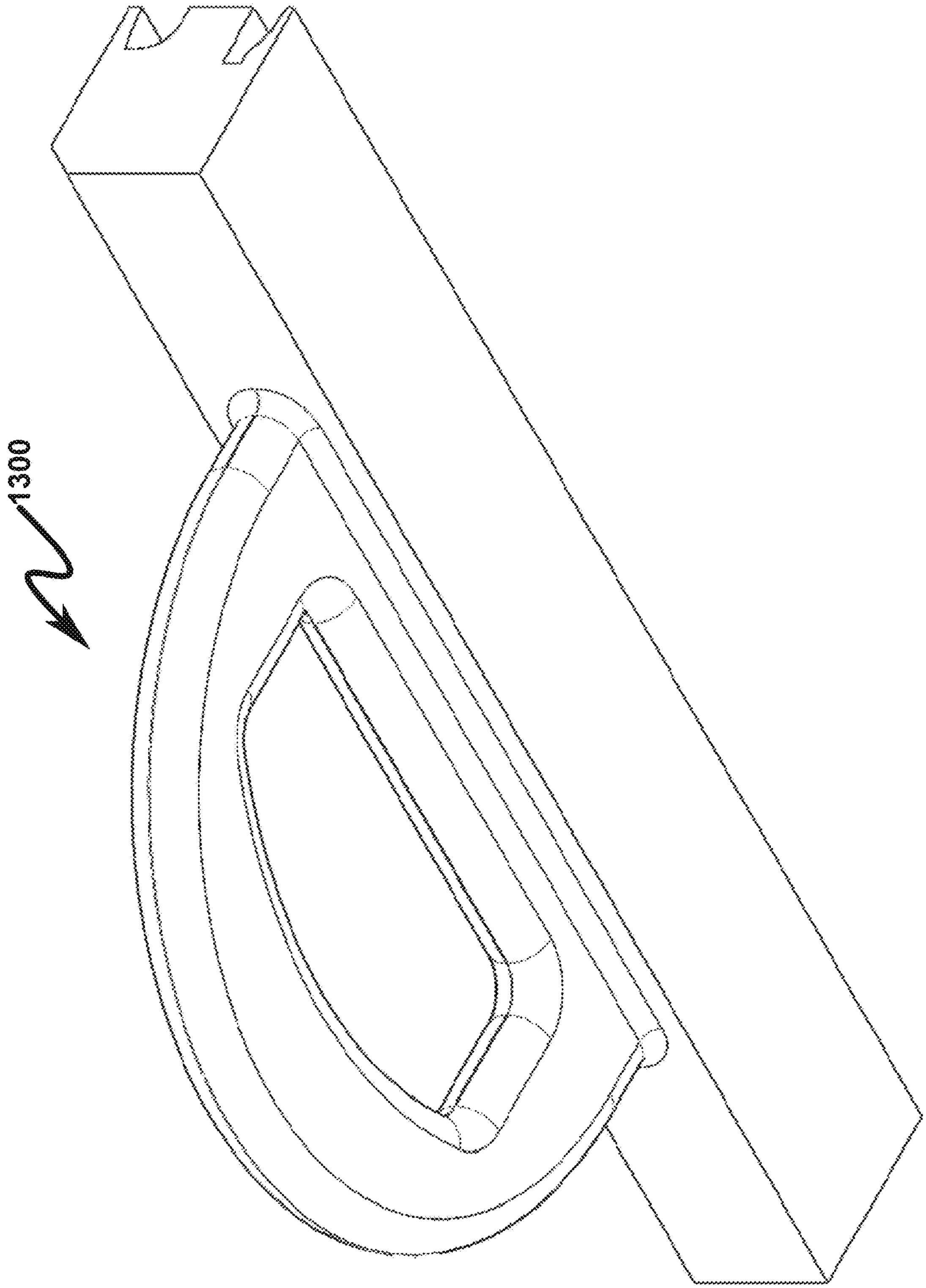
FIG. 13 illustrates a bottom right front perspective view of a preferred exemplary invention embodiment.
Figure 14:
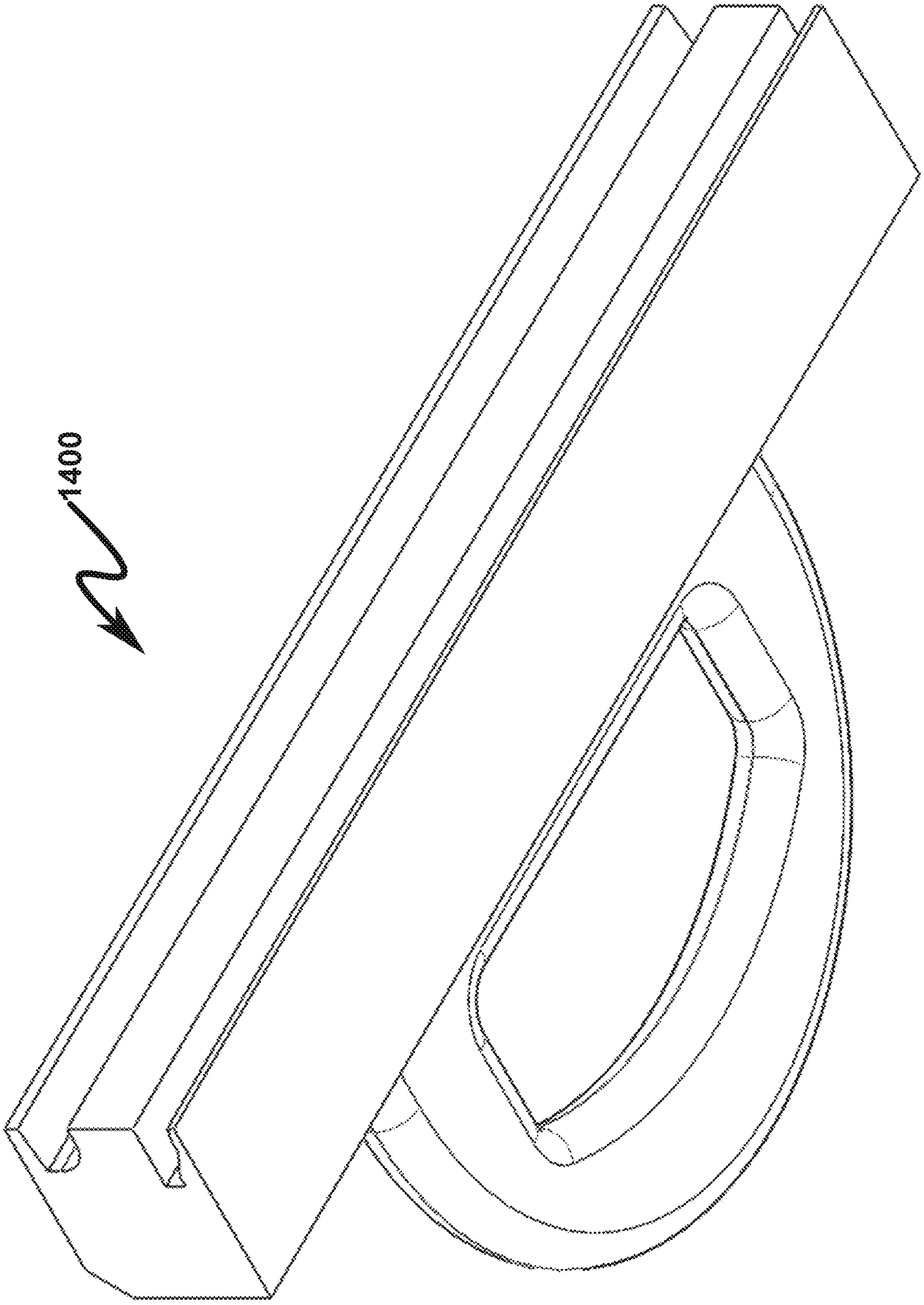
FIG. 14 illustrates a bottom right rear perspective view of a preferred exemplary invention embodiment.
Figure 15:
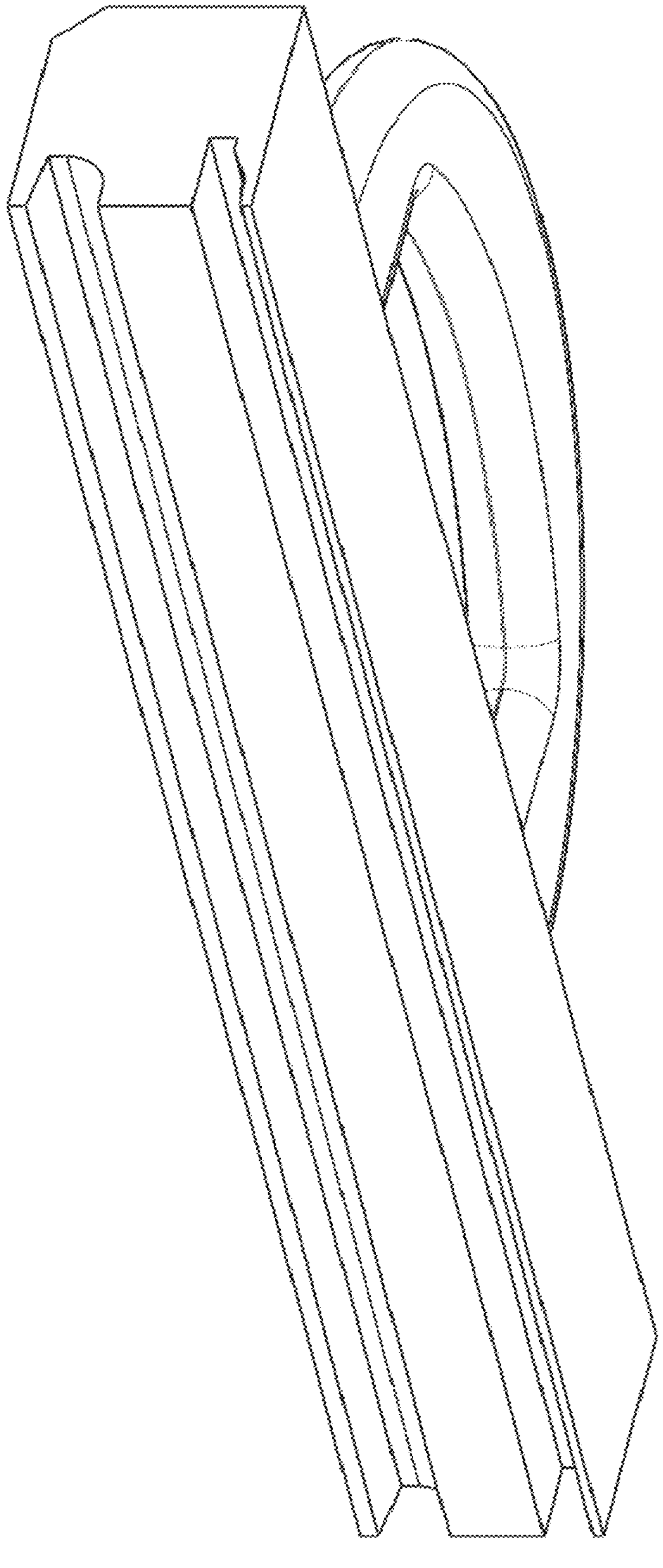
FIG. 15 illustrates a bottom left rear perspective view of a preferred exemplary invention embodiment.
Figure 16:
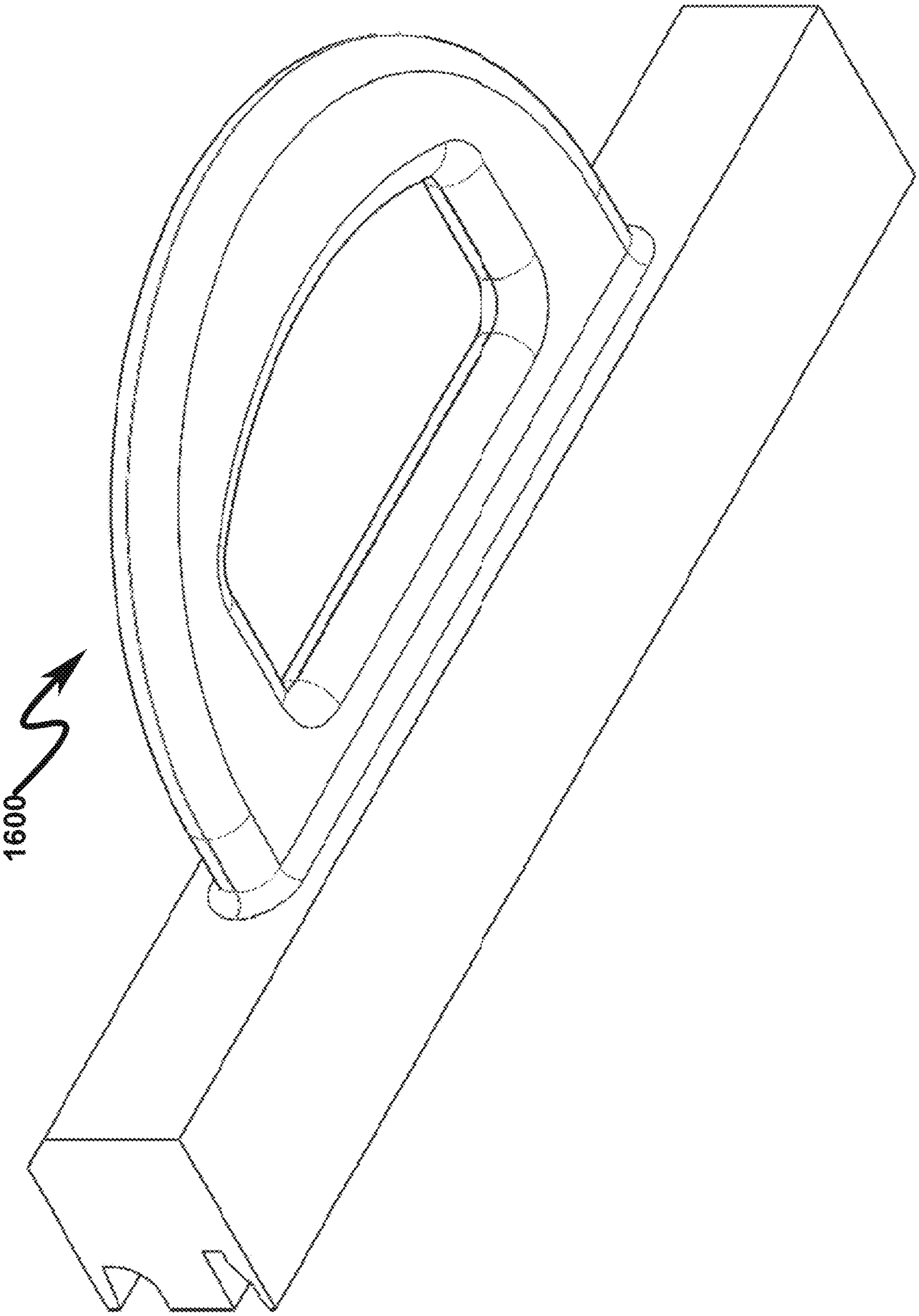
FIG. 16 illustrates a bottom left front perspective view of a preferred exemplary invention embodiment.
Figure 17:
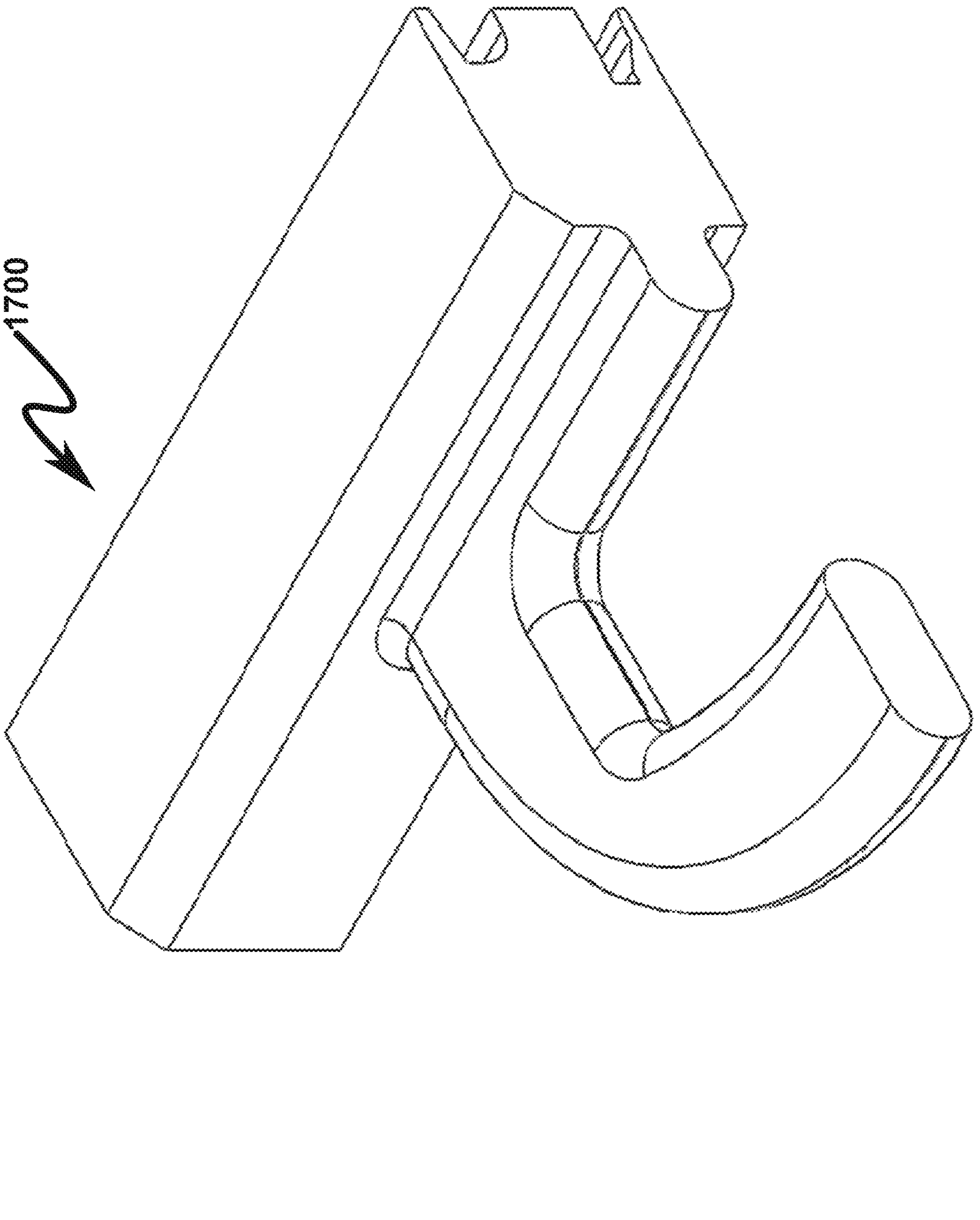
FIG. 17 illustrates a top right front perspective section view of a preferred exemplary invention embodiment.
Figure 18:
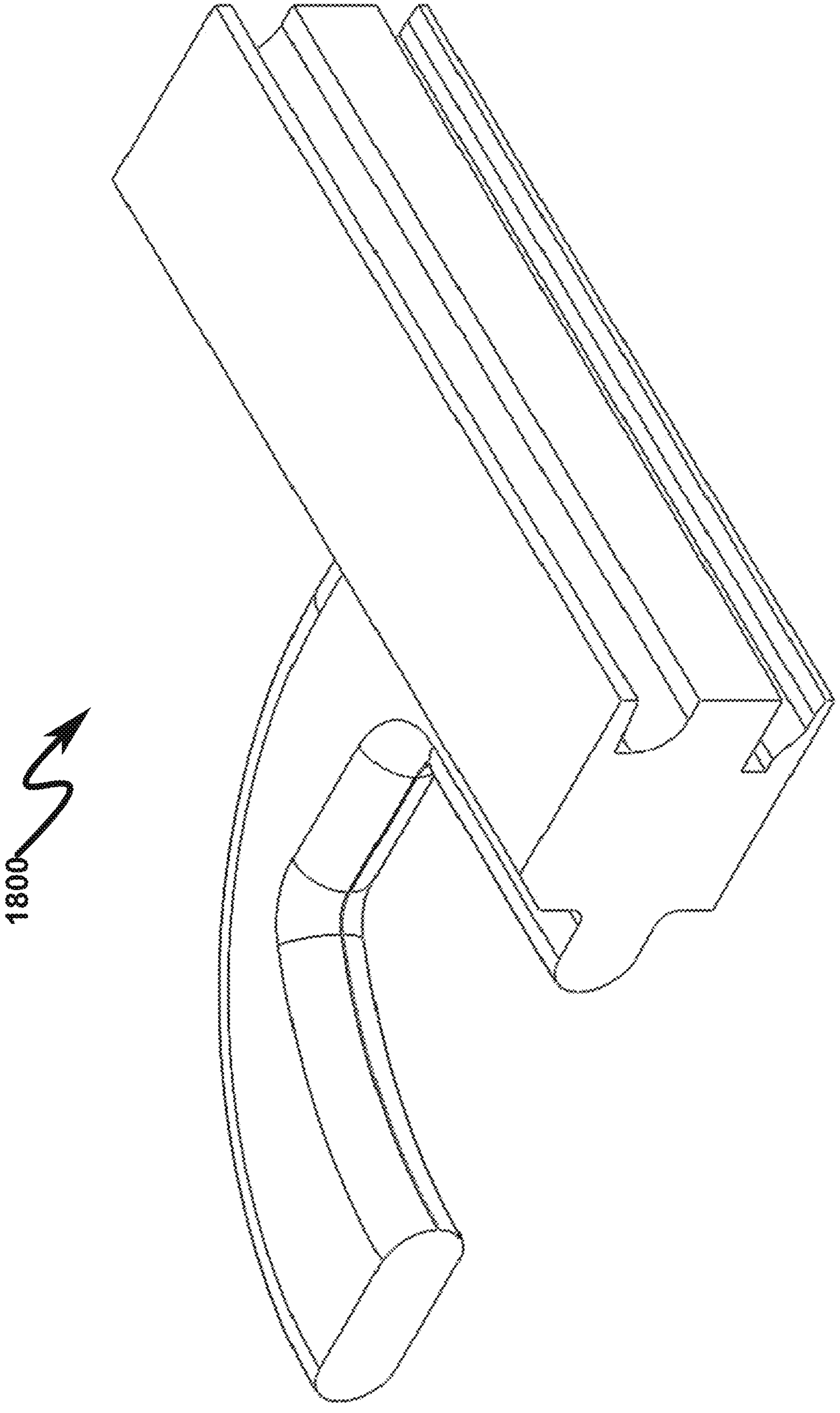
FIG. 18 illustrates a top right rear perspective section view of a preferred exemplary invention embodiment.
Figure 19:
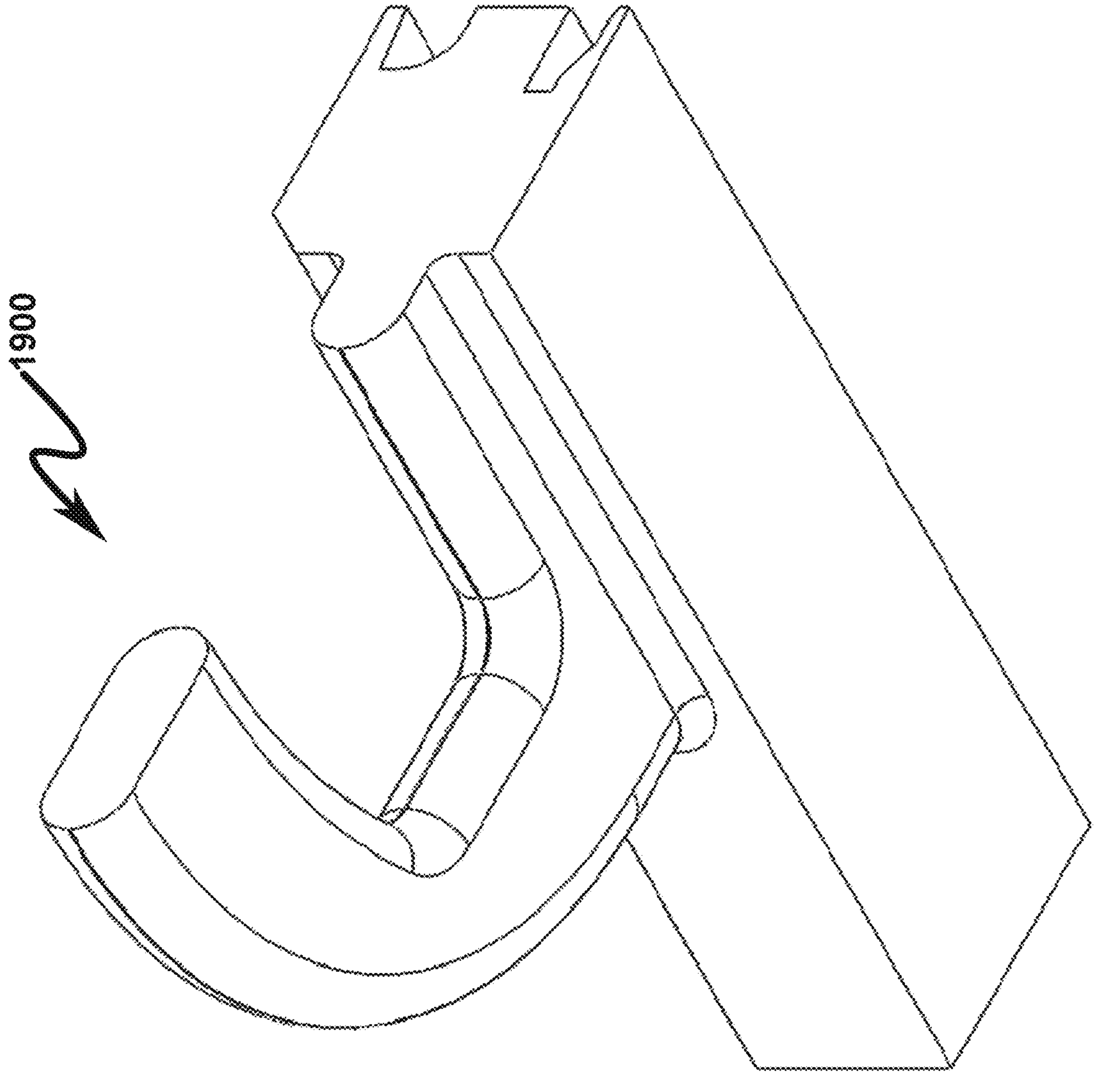
FIG. 19 illustrates a bottom right front perspective section view of a preferred exemplary invention embodiment.
Figure 21:
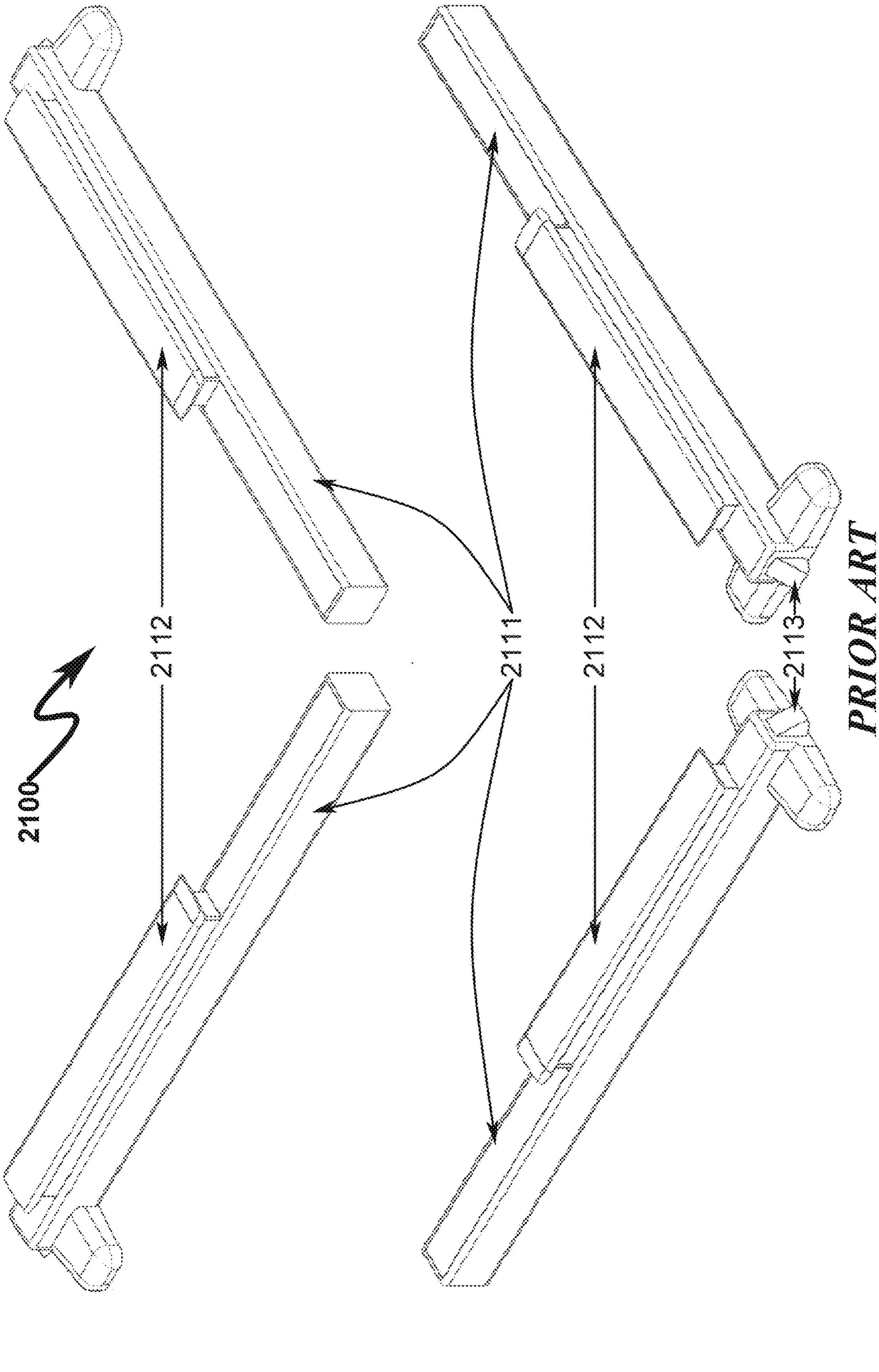
FIG. 21 PRIOR ART
FIG. 21 illustrates perspective views of a prior art "99 SERIES" push bar assembly (PBA)

As generally depicted in FIG. 5 (0500), the present invention is generally constructed so as to maintain a separation distance between the PPB and PBB when installed on the PBA by engaging the PLV with the PBB and PPB. This separation distance (0508) as depicted in FIG. 5 (0500) is maintained whenever the PBL is installed on the PBA and ensures that the door locking roller (DLR) (as generally depicted in the PBA of FIG. 21 (2100, 2113) and in the PBA of FIG. 22 (2200, 2223)) in the PBA remains engaged with the door frame hasp (not shown) so as to keep the door closed and locked while the PBL is installed. This prevents the door from being opened from the outside while the PBL is temporarily installed on the PBA and thus prevents terrorist actors and other outside building threats from entering the building through the door.

Method Overview (0200)

Figure 2:
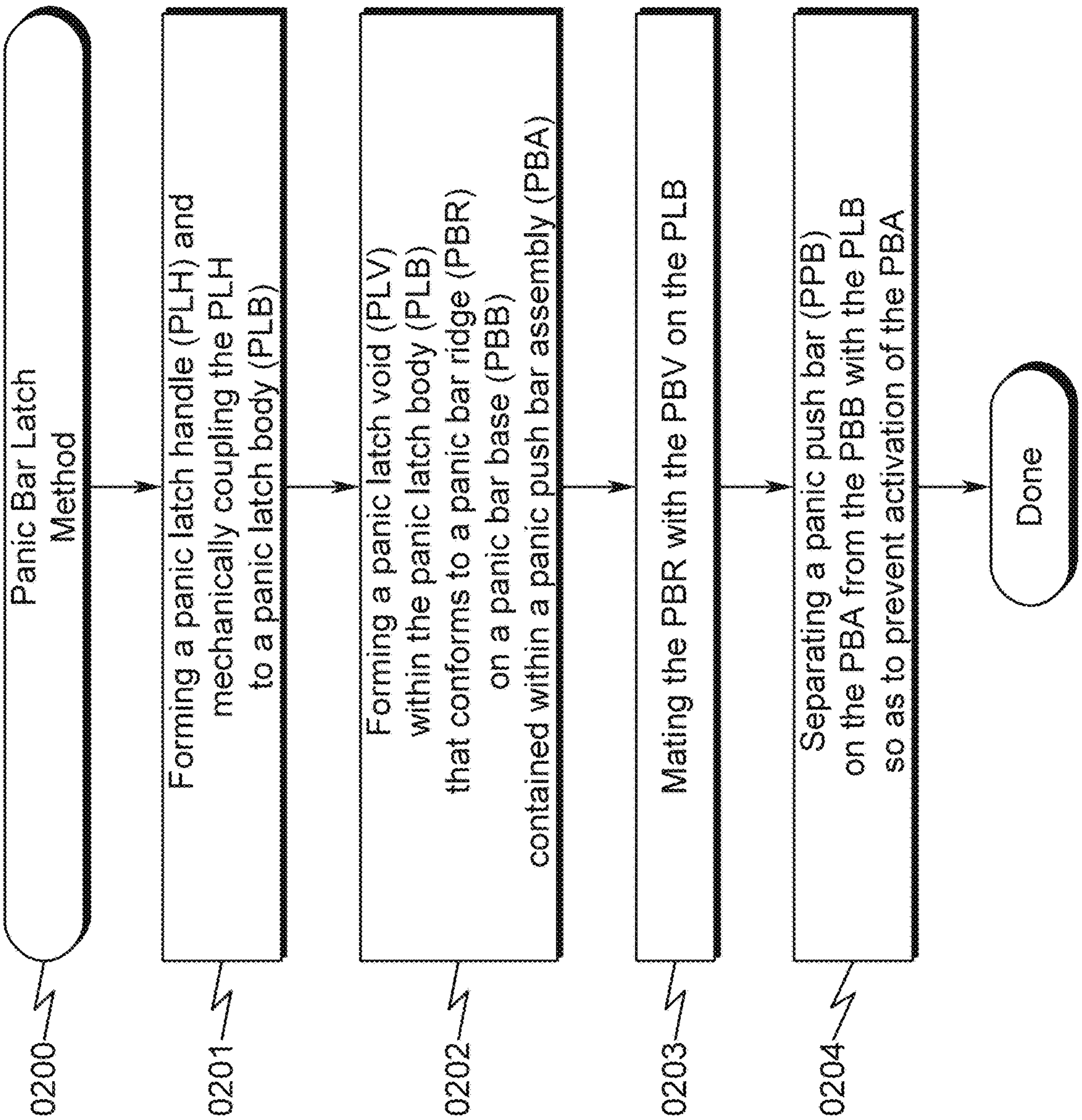
FIG. 2 illustrates a flowchart illustrating a preferred exemplary method embodiment of the present invention.

As generally depicted in the flowchart of FIG. 2 (0200) the present invention may implement a panic bar latch (PBL) method operating on a panic bar latch (PBL) system as described above wherein the method comprises:

(1) forming a panic latch handle (PLH) and mechanically coupling the PLH to a panic latch body (PLB) (0201);

(2) forming a panic latch void (PLV) within the panic latch body (PLB) that conforms to a panic bar ridge (PBR) on a panic bar base (PBB) contained within a panic push bar assembly (PBA) (0202);

(3) mating the PBR with the PBV on the PLB (0203); and (4) separating a panic push bar (PPB) on the PBA from the PBB with the PLB so as to prevent activation of the PBA (0204).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Exemplary System Construction (0300)-(2000)

Figure 3:
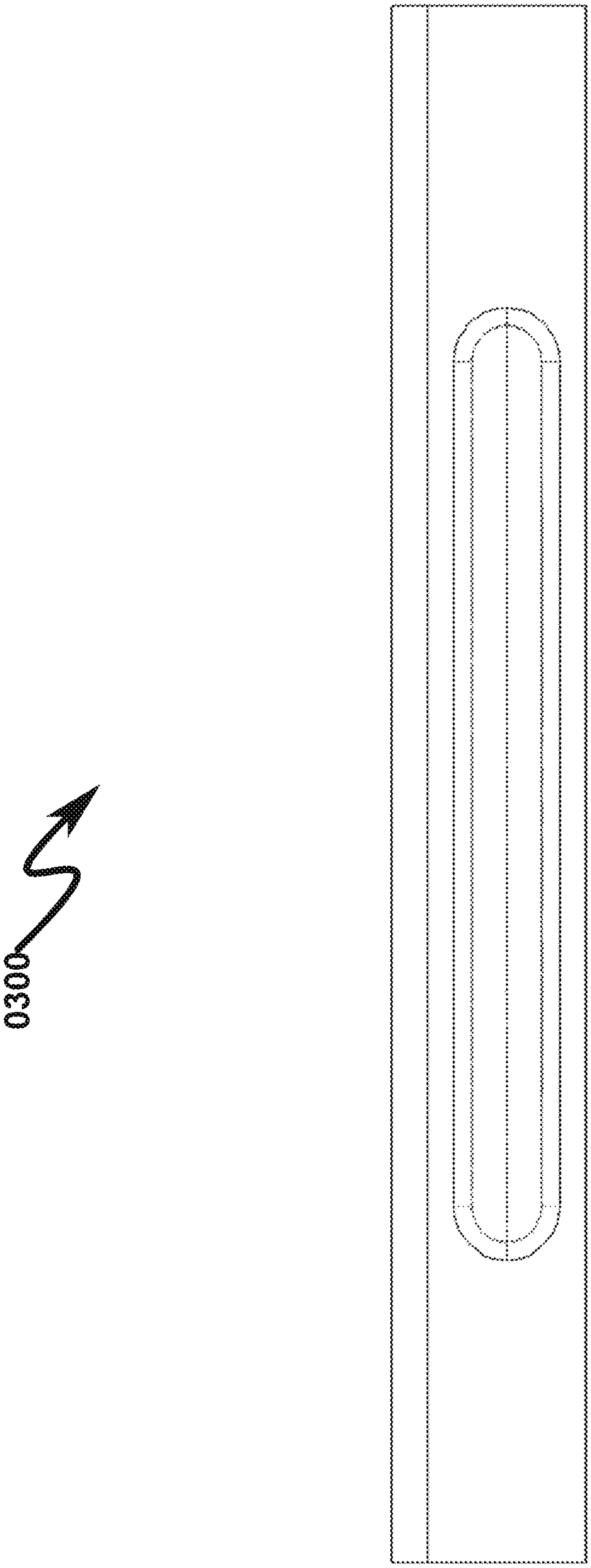
FIG. 3 illustrates a front view of a preferred exemplary invention embodiment.
Figure 4:
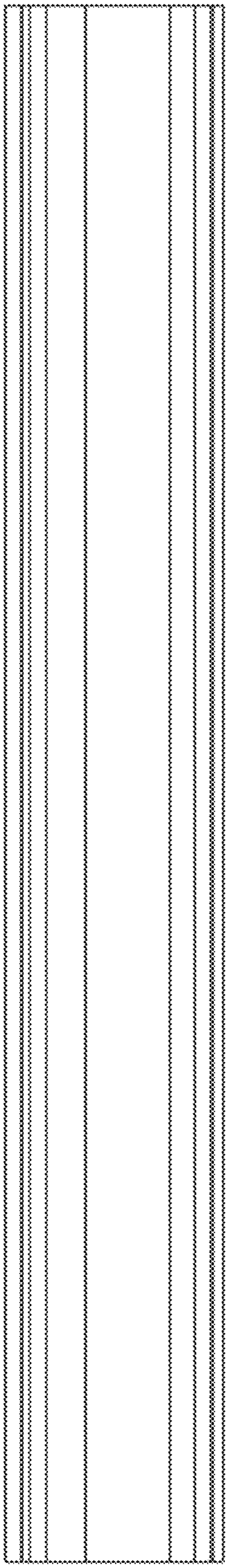
FIG. 4 illustrates a rear of a preferred exemplary invention embodiment.
Figure 20:
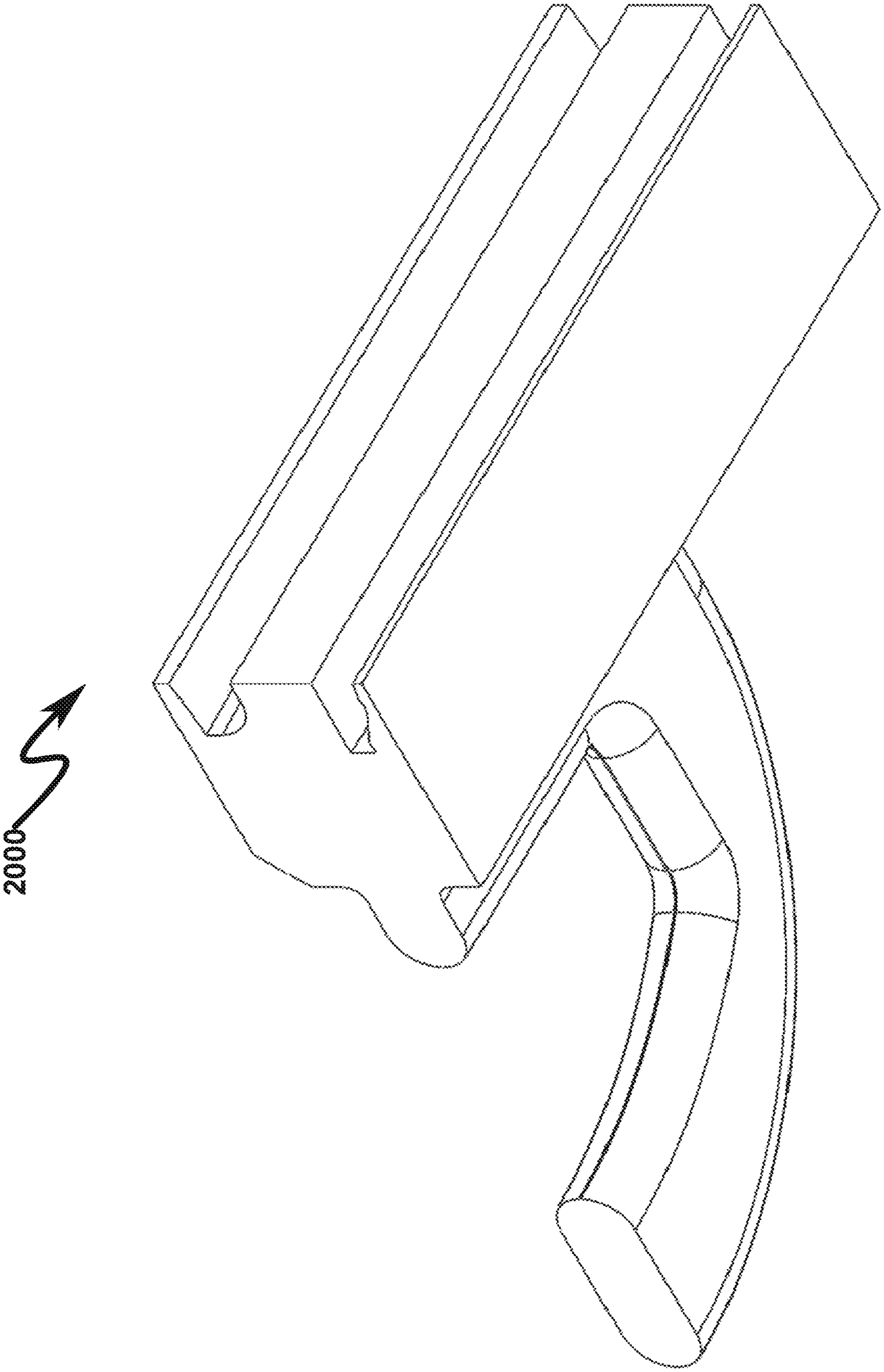
FIG. 20 illustrates a bottom right rear perspective section view of a preferred exemplary invention embodiment.

The present invention system in a preferred exemplary embodiment is generally illustrated in the various views of FIG. 3 (0300)-FIG. 20 (2000). One skilled in the art may recognize that this construction is only exemplary of many configurations in which the PBL is constructed to mate to a panic bar assembly (PBA).

Exemplary PBA Construction (2100)-(2200)

Figure 22:
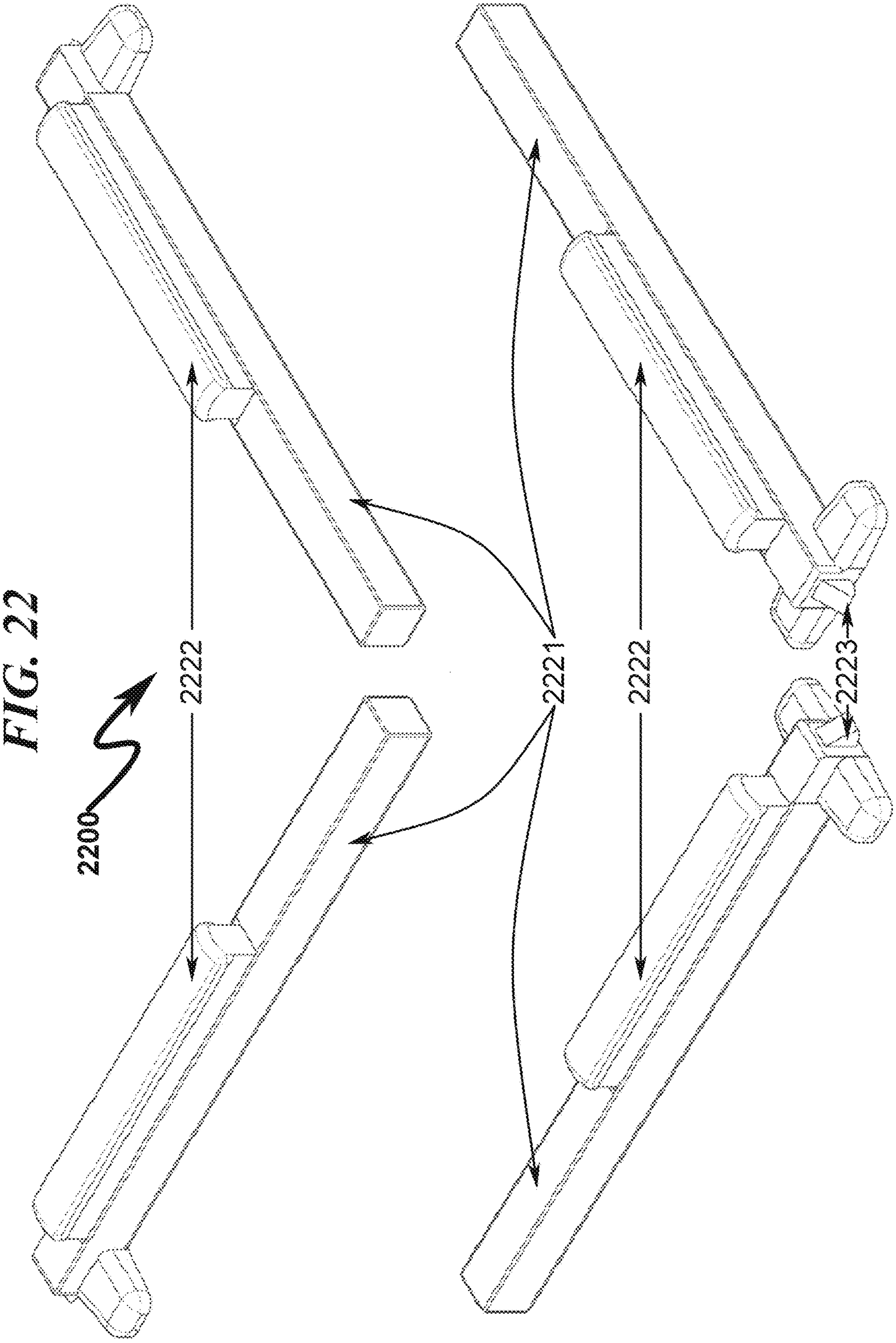
FIG. 22 PRIOR ART
FIG. 22 illustrates perspective views of a prior art "ED5000 SERIES" push bar assembly (PBA)

While many PBAs are available in the marketplace, exemplary PBA construction is generally depicted in the "SERIES 99" PBA of FIG. 21 (2100) and the "ED5000 SERIES" PBA of FIG. 22 (2200). These exemplary PBAs have generally similar construction but have different mechanical construction of the PBB ridges that engage the PLVs of the present invention.

Figure 28:
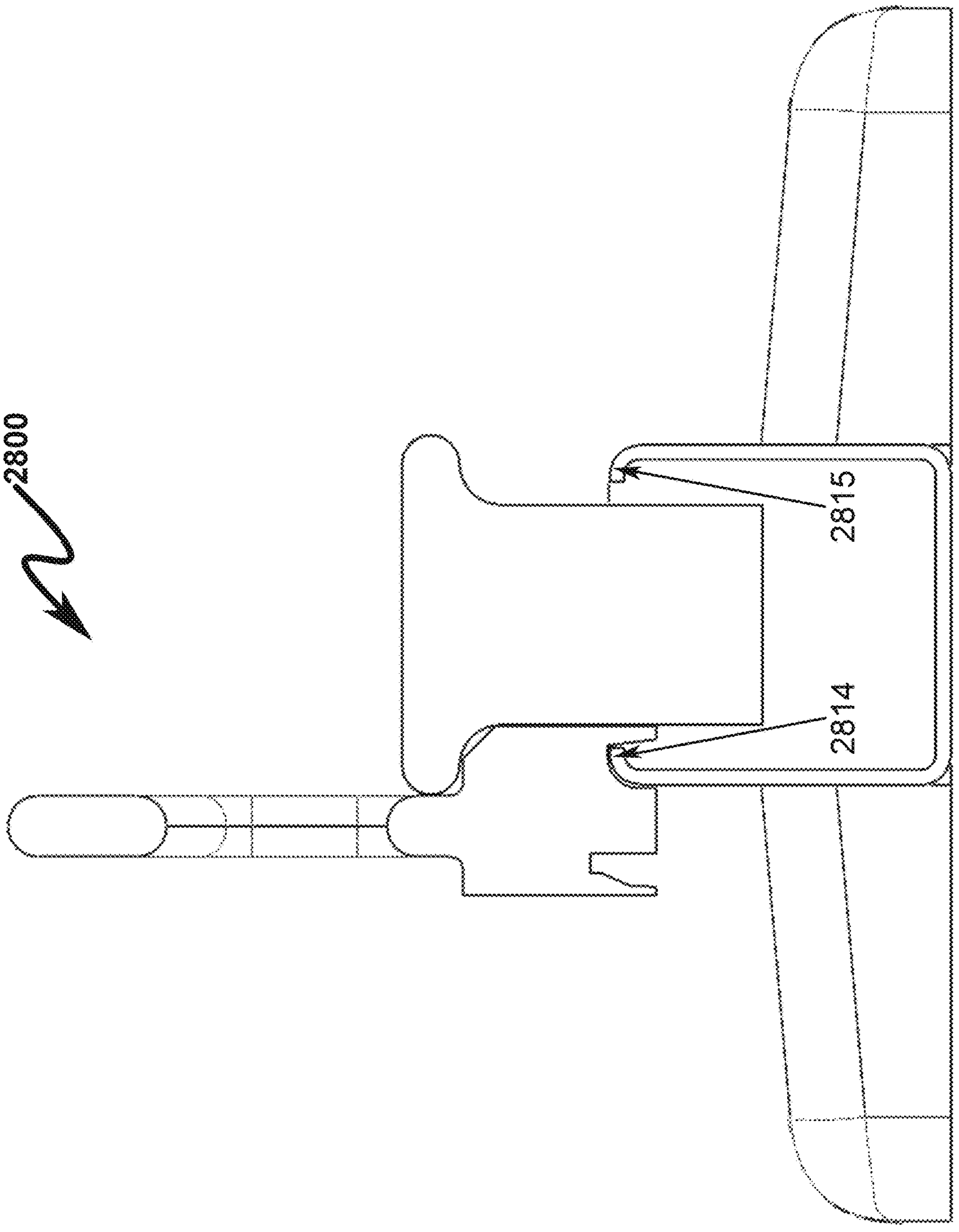
FIG. 28 illustrates a right side section view of a present invention as applied to a typical prior art "99 SERIES" push bar assembly (PBA)

As generally depicted in FIG. 21 (2100) and FIG. 22 (2200), the PBAs comprise a panic bar base (PBB) (2111, 2221) and a panic push bar (PPB) (2112, 2222) that controls a door locking roller (DLR) (2113, 2223) that engages a door locking bolt (DLB) (not shown) to positively lock the door to which the PLA is attached. As generally depicted in FIG. 28 (2800) and FIG. 32 (3200), the PBB is constructed with symmetric panic bar ridges (PBRs) (2814, 2815, 3224, 3225) that mate with the PLVs in the present invention to form a temporary latching mechanism that ensures vertical separation of the PPB and PBB and thus prevents the PLA from activating and allowing the DLR (2113, 2223) from allowing the door to open.

Exemplary PBA Application Context (2300)-(2400)

Figure 23:
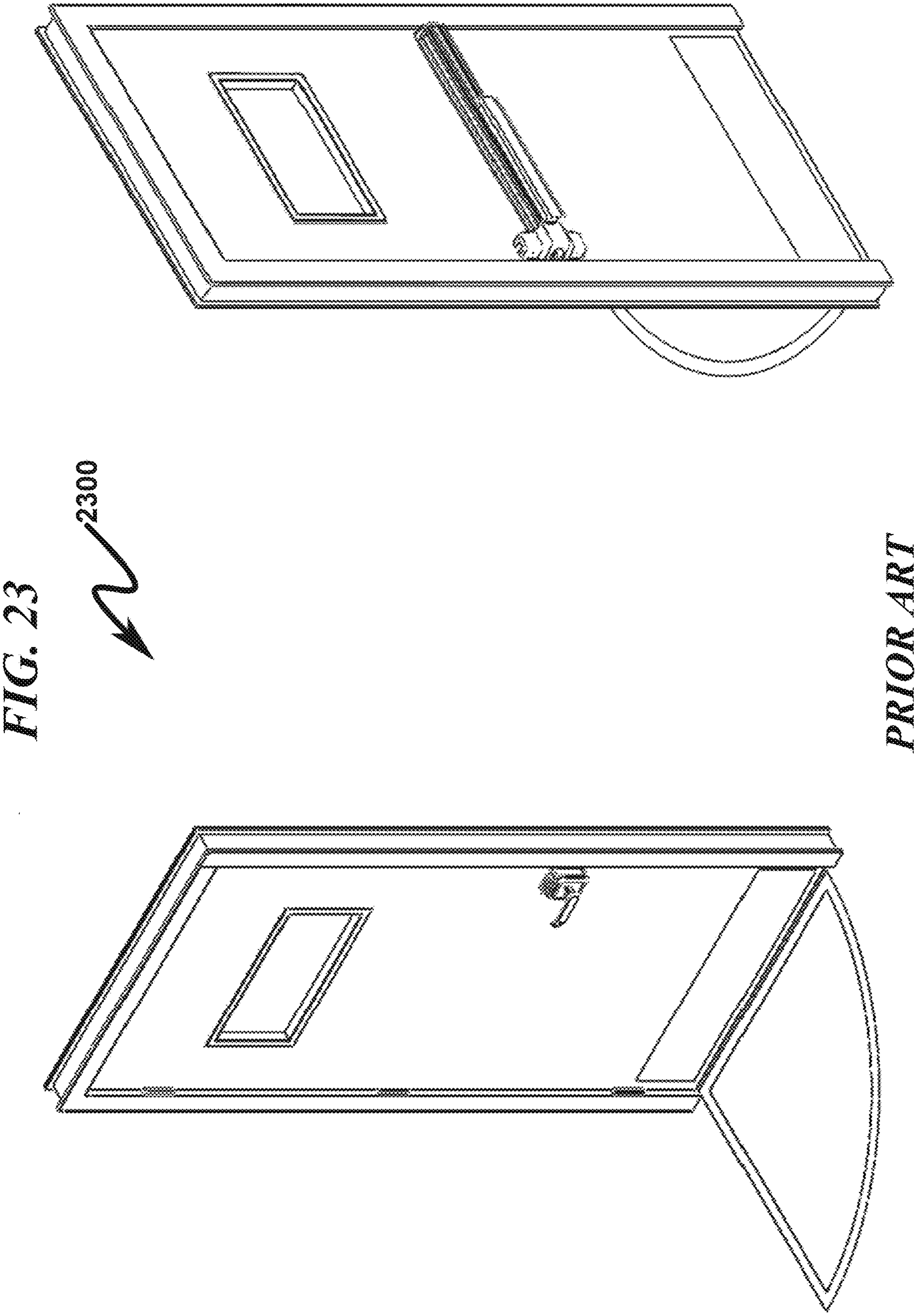
FIG. 23 PRIOR ART
FIG. 23 illustrates perspective views of a typical prior art push bar assembly (PBA) as installed on a door and door frame.
Figure 24:
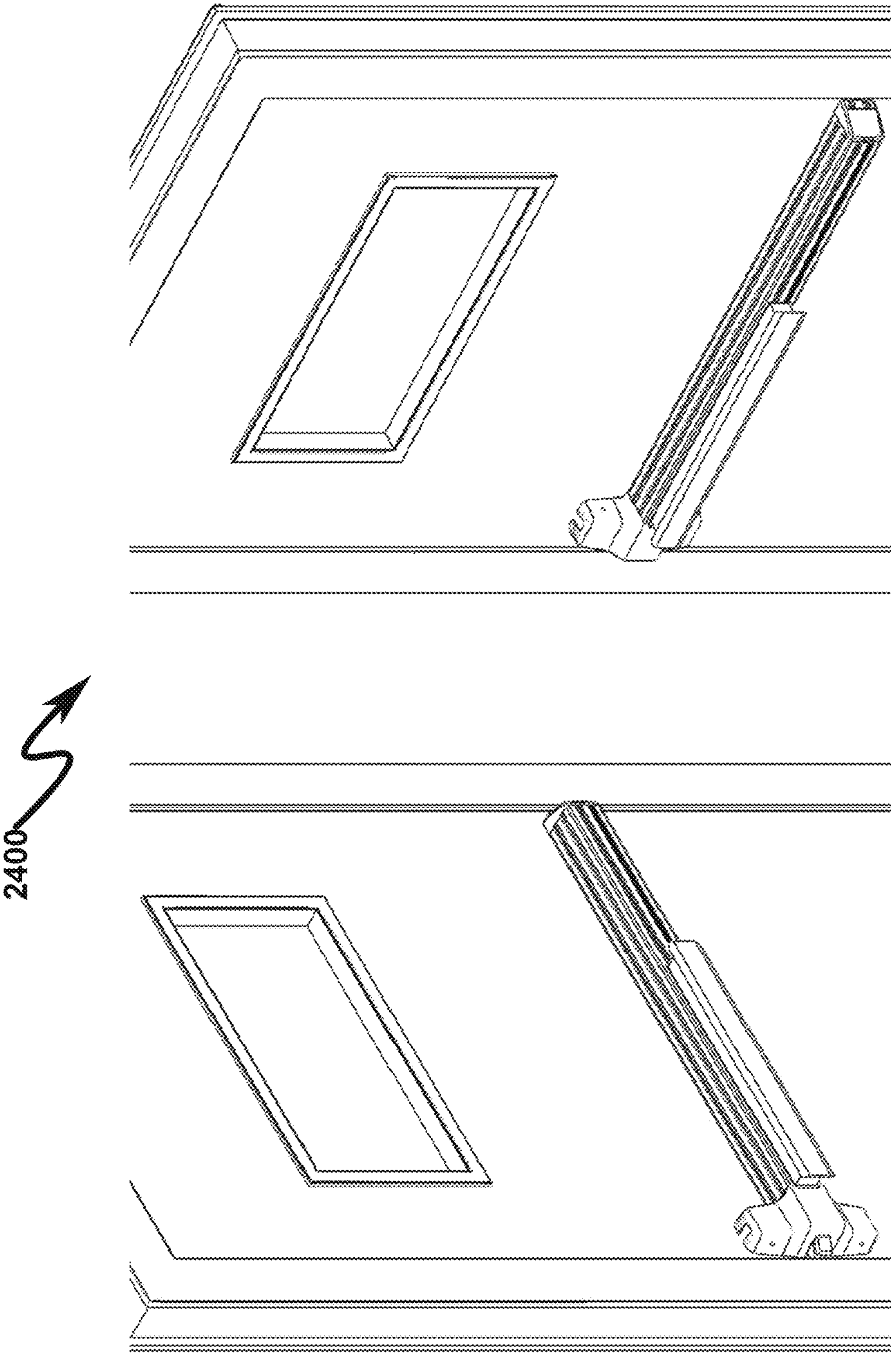
FIG. 24 illustrates detail perspective views of a typical prior art push bar assembly (PBA) as installed on a door and door frame.

While many PBAs are available in the marketplace, an exemplary PBA as applied to a door attached to a conventional doorframe is generally depicted in FIG. 23 (2300)-FIG. 24 (2400). While preferred PBAs are manufactured by major manufacturers such as SARGEANT (including but not limited to models in the AD8600 SERIES; KP SERIES; 5300 SERIES; 8500 SERIES; 8700 SERIES; 8800 SERIES; SURFACE VERTICAL ROD SERIES; and KEYPAD 80 SERIES), CORBIN RUSSWIN (including but not limited to models in the PED4000 SERIES; PED5000 SERIES; ED2000 SERIES; ED4000 SERIES; ED5000 and FE400S SERIES; SERIES), VON DUPRIN (including but not limited to 98 SERIES; and 99 SERIES), and ASSA ABLOY YALE (including but not limited to models in the 7000 SERIES; SERIES; 7200 7100 (F) SERIES; 7200 (F) SERIES; 7200M SERIES; and 7200M (F) SERIES), the present invention is not limited to these particular PBA models.

Exemplary PLV to PBR Engagement (2500)-(3200)

Figure 25:
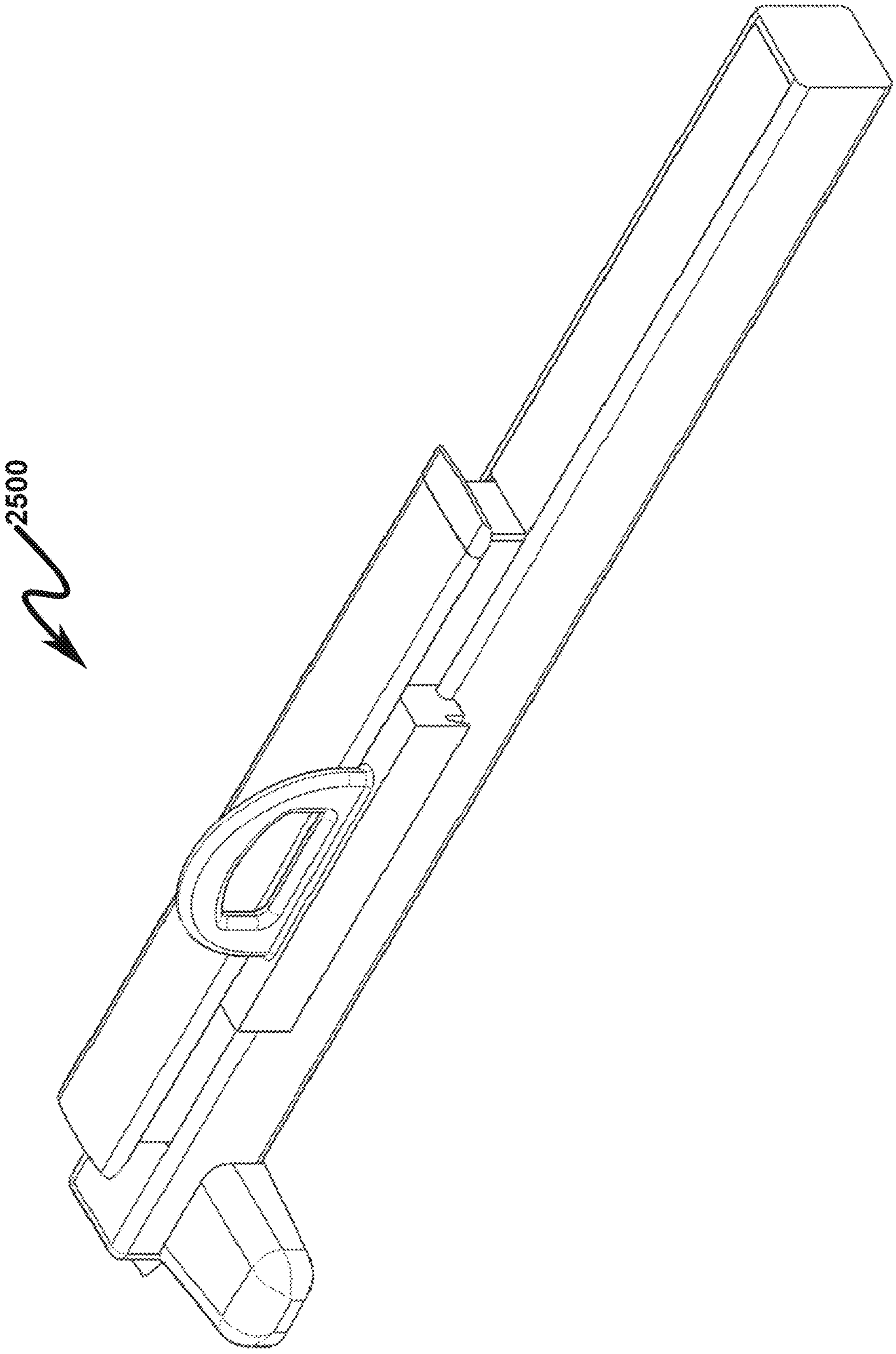
FIG. 25 illustrates a top right front perspective view of a present invention as applied to a typical prior art "99 SERIES" push bar assembly (PBA)
Figure 26:
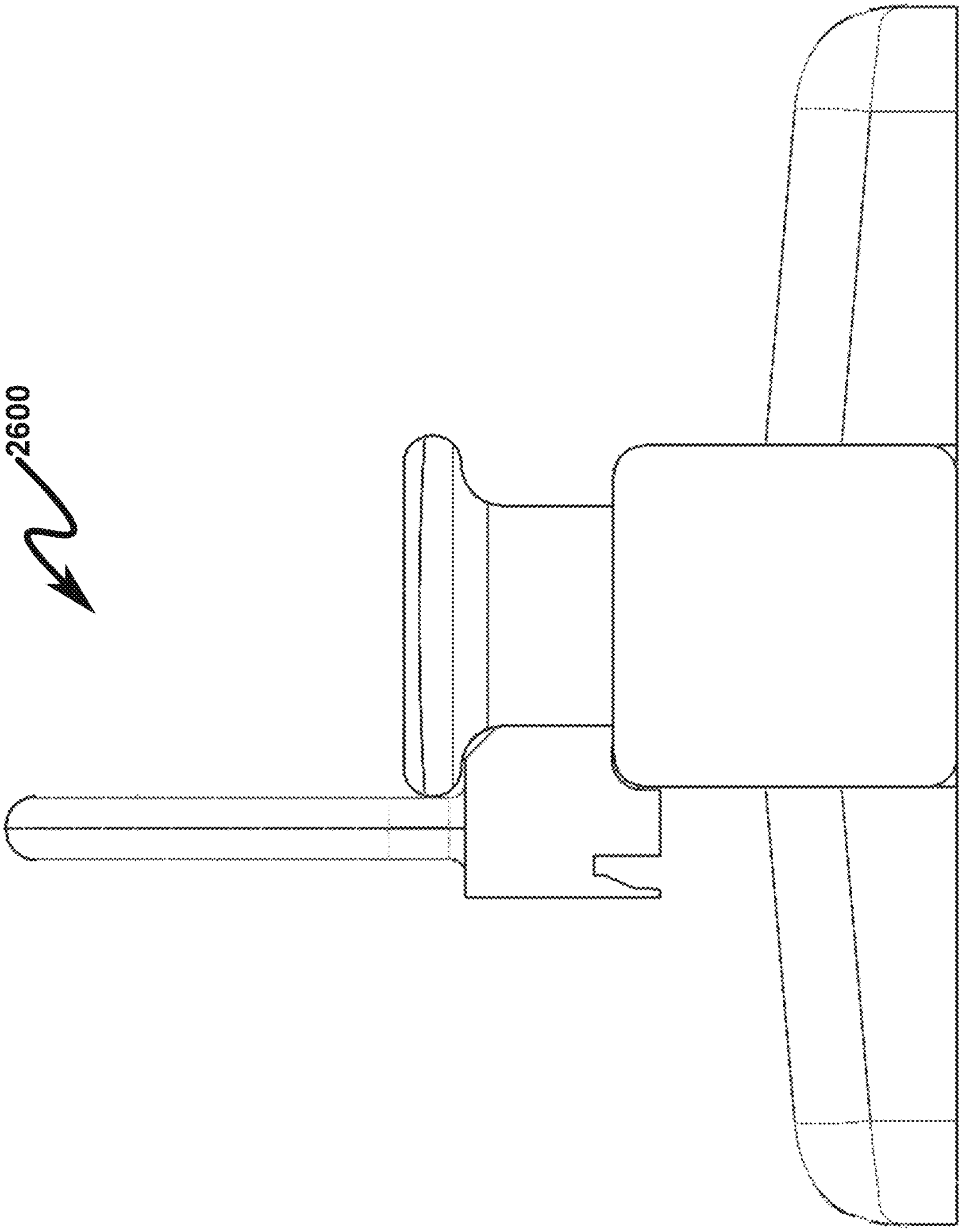
FIG. 26 illustrates a right side view of a present invention as applied to a typical prior art "99 SERIES" push bar assembly (PBA)
Figure 27:
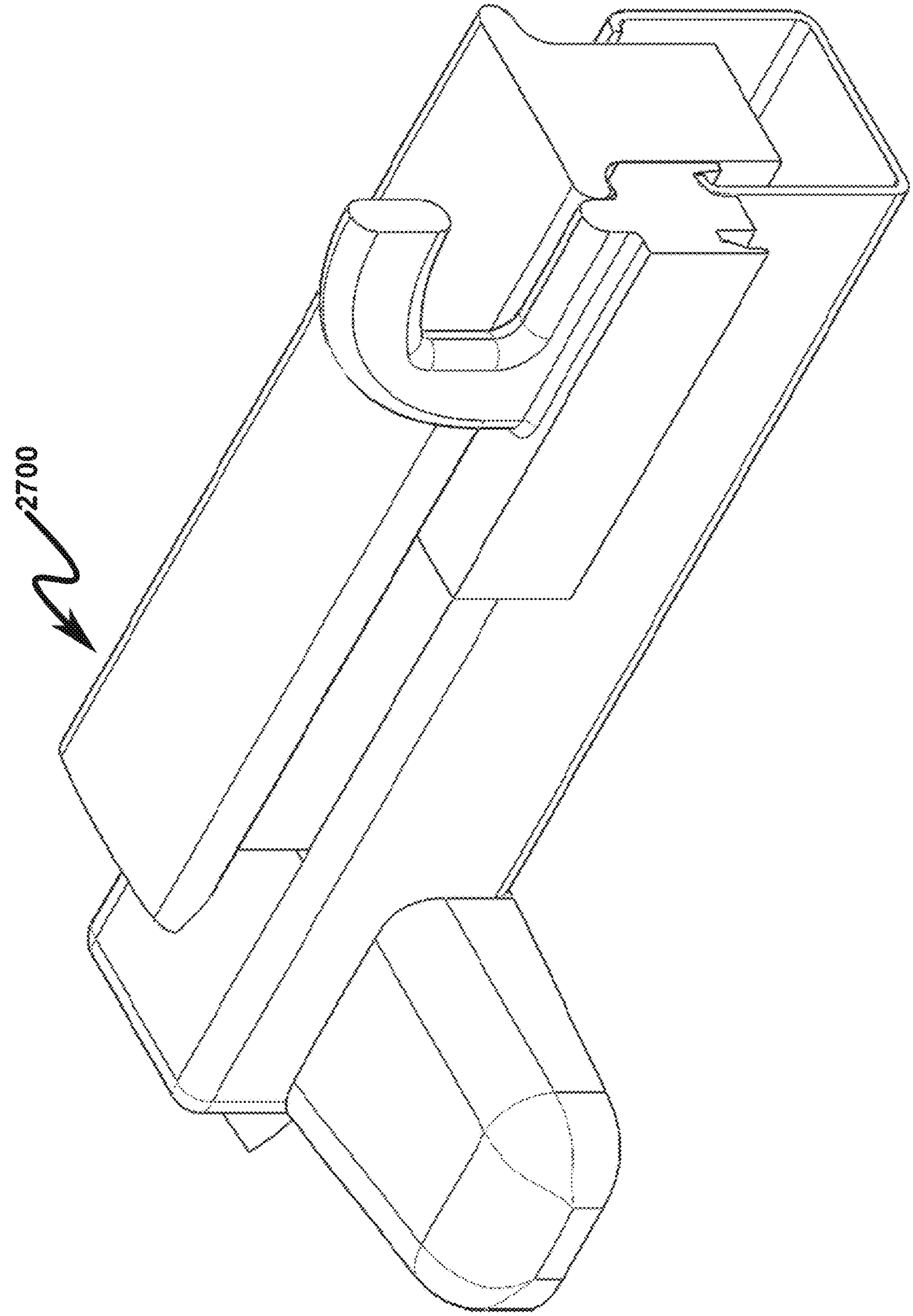
FIG. 27 illustrates a top right front perspective section view of a present invention as applied to a typical prior art "99 SERIES" push bar assembly (PBA)
Figure 29:
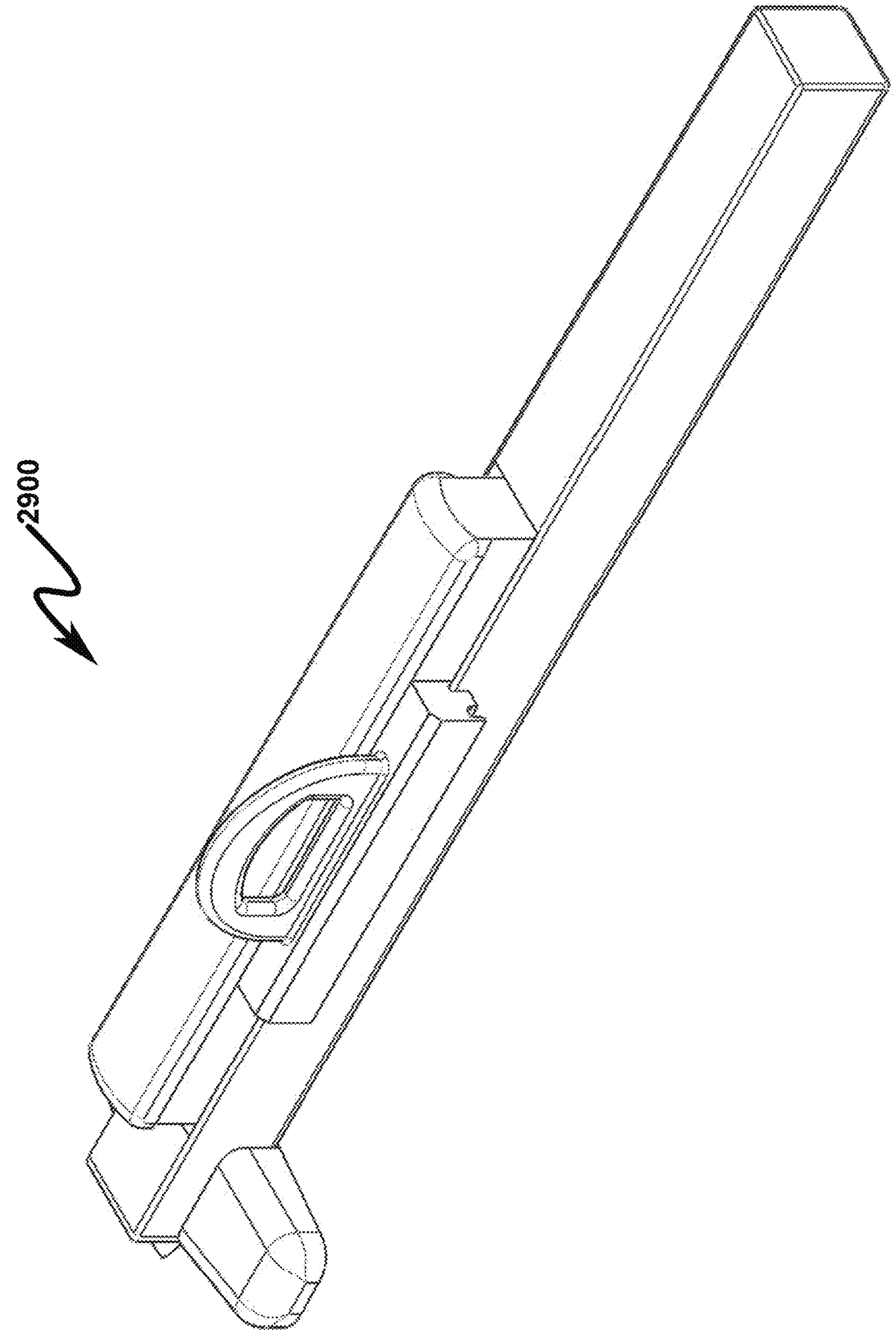
FIG. 29 illustrates a top right front perspective view of a present invention as applied to a typical prior art "ED5000 SERIES" push bar assembly (PBA)
Figure 30:
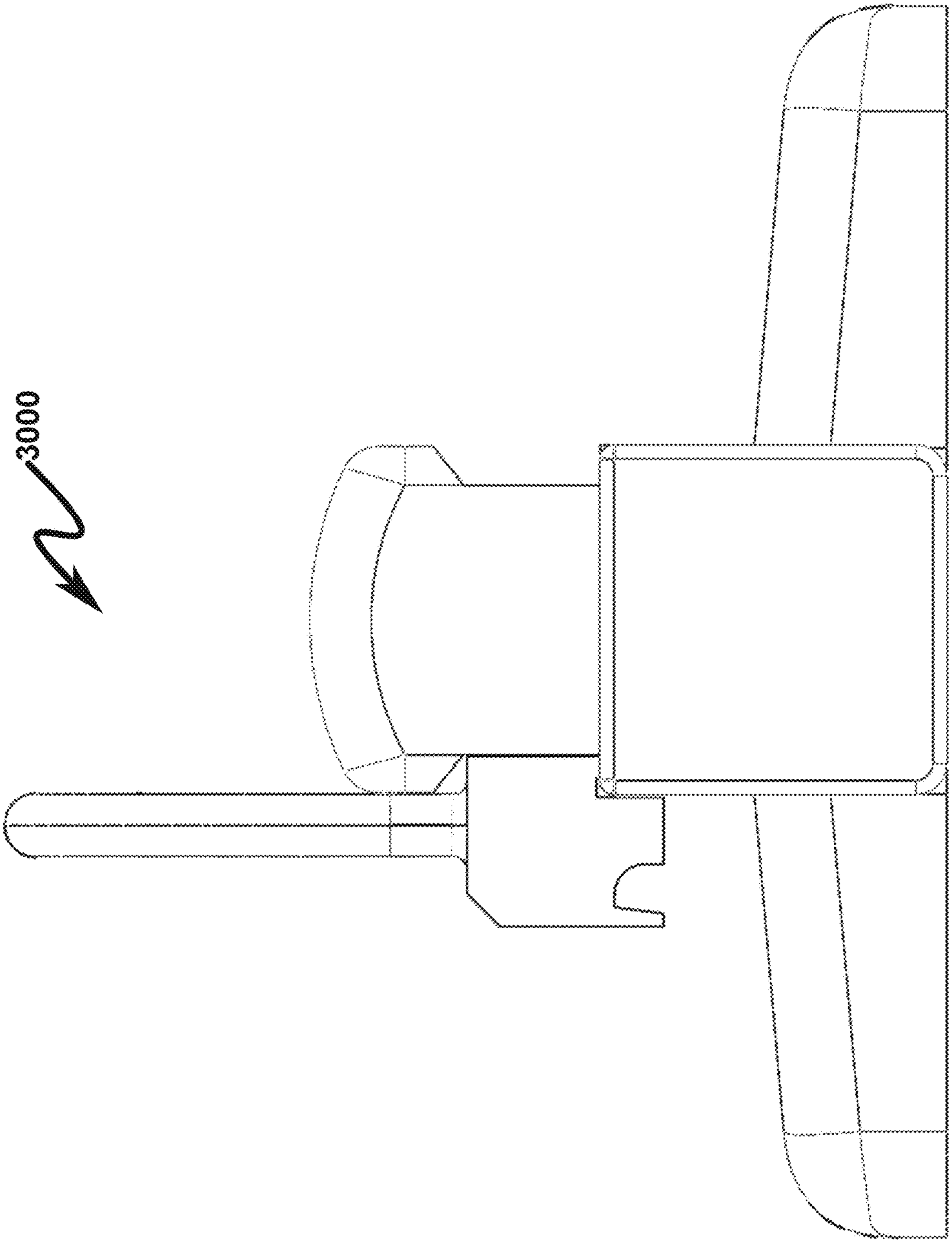
FIG. 30 illustrates a right side view of a present invention as applied to a typical prior art "ED5000 SERIES" push bar assembly (PBA)
Figure 31:
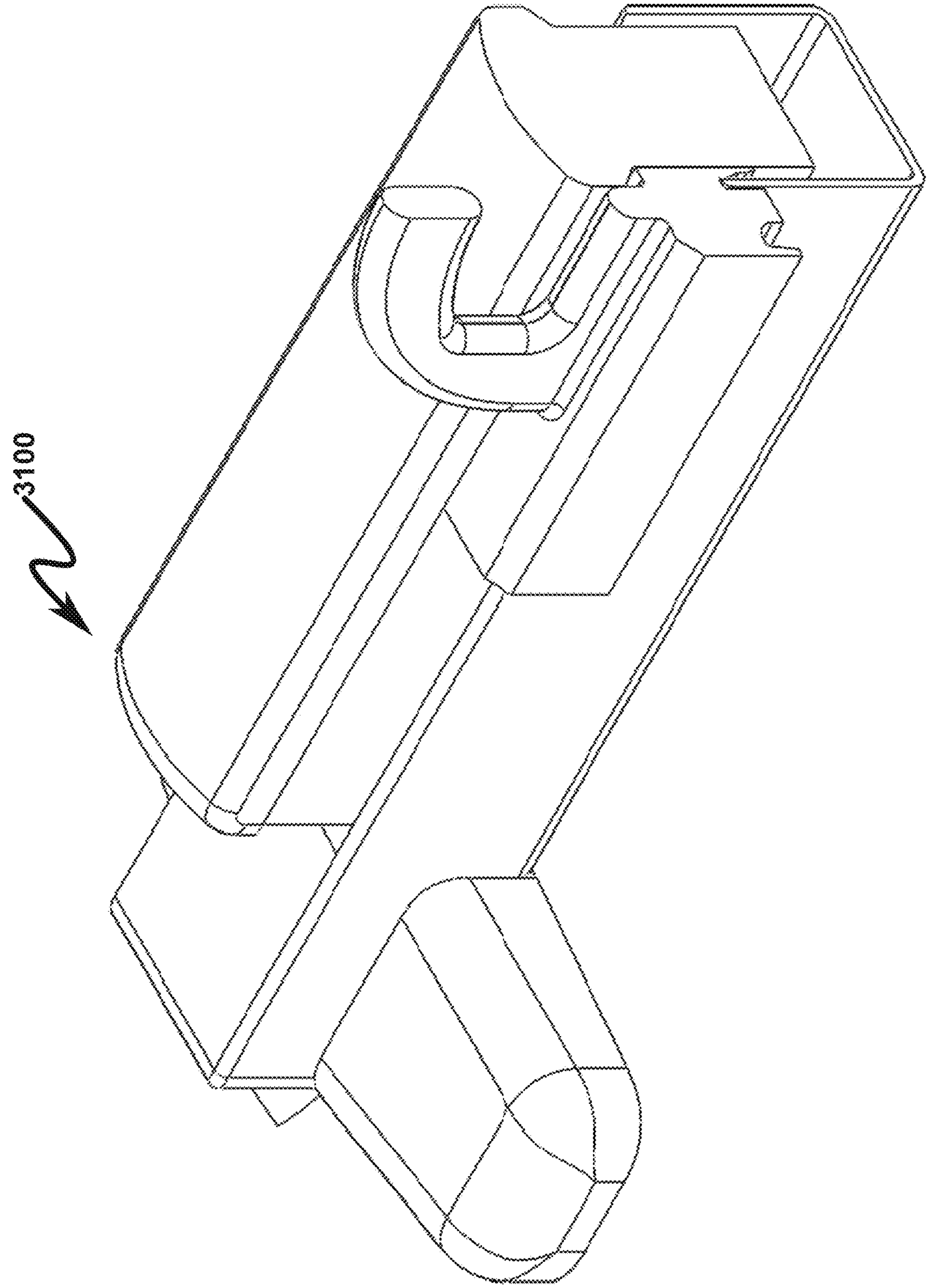
FIG. 31 illustrates a top right front perspective section view of a present invention as applied to a typical prior art "ED5000 SERIES" push bar assembly (PBA)
Figure 32:
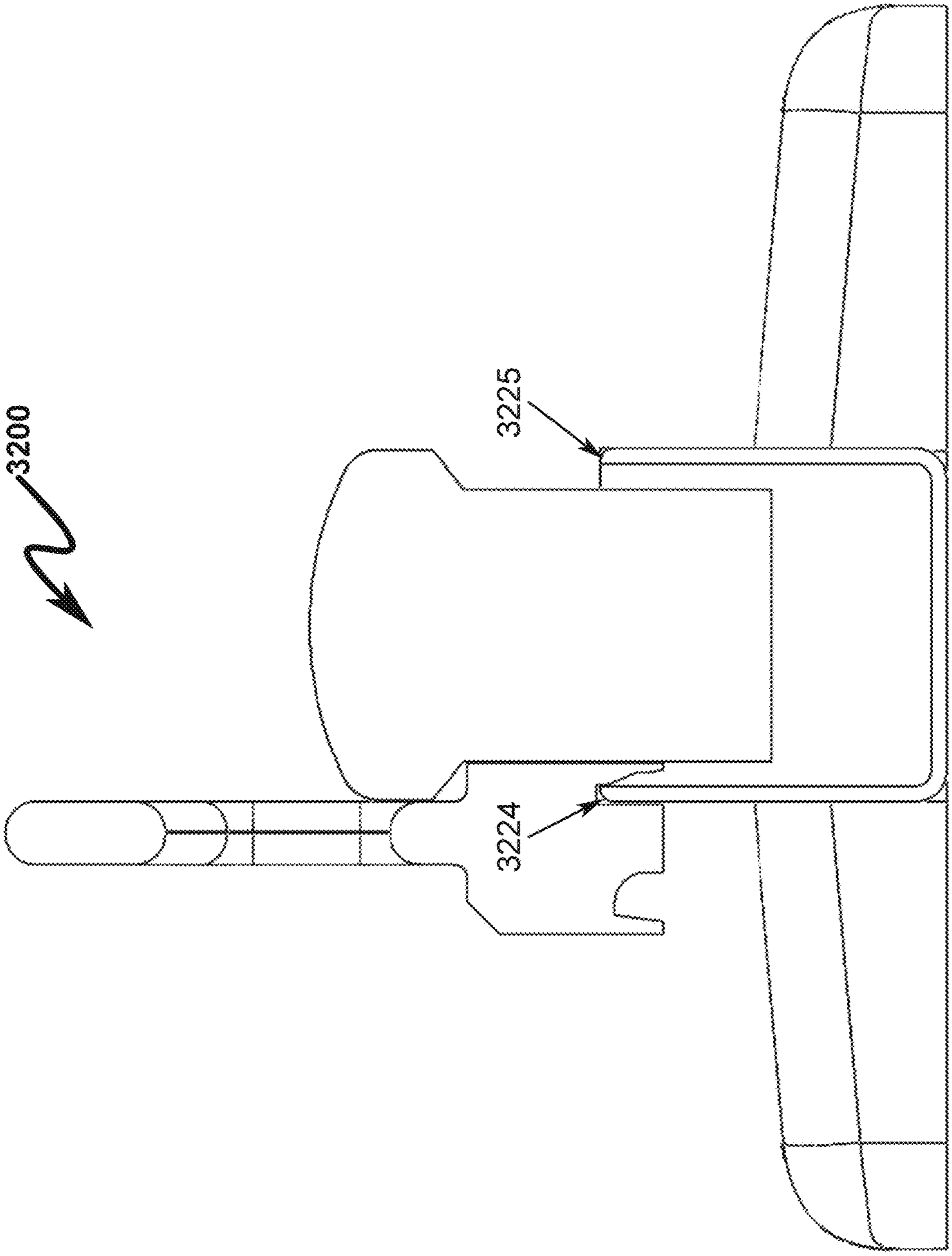
FIG. 32 illustrates a right side section view of a present invention as applied to a typical prior art "ED5000 SERIES" push bar assembly (PBA).

FIG. 25 (2500)-FIG. 32 (3200) depict a presently preferred exemplary invention embodiment as applied to two different prior art push bar assemblies (PBAs). FIG. 25 (2500)-FIG. 28 (2800) depict a presently preferred exemplary invention embodiment as applied to a "SERIES 99" PBA. FIG. 29 (2900)-FIG. 32 (3200) depict a presently preferred exemplary invention embodiment as applied to a "ED5000 SERIES" PBA.

These exemplary PBL-to-PBA mating arrangements detail exemplary engagement of the PLV to the PBR of an exemplary PBA. The PBL in each instance is identical and illustrates how a single PBL may be configured to work with more than one PBA having different PBB construction.

As can be seen by these examples, the panic latch void (PLV) is configured to mate to the profile of the particular PPB and PBB associated with the PBA. One skilled in the art will recognize that the particular PLV associated with a given implementation of the present invention will be determined by the particular panic push bar top and/or bottom (PPB) as well as the construction of the panic bar base (PBB) to be captured by the PLV.

System Summary

The present invention system may be broadly generalized as a panic bar latch (PBL) system comprising:

(a) panic latch handle (PLH); and
(b) panic latch body (PLB);
wherein:
the PLH is mechanically coupled to the PLB;
the PLH comprises an open handle void (OHV);
the PLB comprises a panic latch void (PLV) that is configured to mechanically conform and couple (MCC) to a panic bar base (PBB) on a panic bar assembly (PBA) via a panic bar ridge (PBR) located on the PBB;
the PBA is mechanically coupled to a door and controls passage through a door frame in which the door is attached;
the PBL temporary disables function of the panic bar assembly (PBA) and prevents a panic push bar (PPB) on the PBA from being depressed or released when the PBL is installed on the PBB by placing the PBR within the PLV; and
the PBL temporary disables function of the panic bar assembly (PBA) by maintaining a fixed separation between the PPB and the PBB of the PBA when the PBL is installed on the PBB by placing the PBR within the PLV.

This general system summary may be augmented by the various elements described herein to produce a wide variety of invention embodiments consistent with this overall design description.

Method Summary

A preferred exemplary embodiment of the present invention method may be broadly generalized as a panic bar latch (PBL) method operating on a panic bar latch (PBL) system comprising:

(a) panic latch handle (PLH); and
(b) panic latch body (PLB);
wherein:
the PLH is mechanically coupled to the PLB;
the PLH comprises for receiving a user's hand for operating the handle;
the PLB comprises a panic latch void (PLV) that is configured to mechanically conform and couple (MCC) to a panic bar base (PBB) on a panic bar assembly (PBA) via a panic bar ridge (PBR) located on the PBB;
the PBA is mechanically coupled to a door and controls passage through a door frame in which the door is attached;
the PBL temporary disables function of the panic bar assembly (PBA) and prevents a panic push bar (PPB) on the PBA from being depressed or released when the PBL is installed on the PBB by placing the PBR within the PLV; and
the PBL temporary disables function of the panic bar assembly (PBA) by maintaining a fixed separation between the PPB and the PBB of the PBA when the PBL is installed on the PBB by placing the PBR within the PLV;
wherein the method comprises the steps of:
(1) forming a panic latch handle (PLH) and mechanically coupling the PLH to a panic latch body (PLB) (0201);
(2) forming a panic latch void (PLV) within the panic latch body (PLB) that conforms to a panic bar ridge (PBR) on a panic bar base (PBB) contained within a panic push bar assembly (PBA) (0202);
(3) mating the PBR with the PBV on the PLB (0203); and
(4) separating a panic push bar (PPB) on the PBA from the PBB with the PLB so as to prevent activation of the PBA (0204).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

- An embodiment wherein the PLB is configured with a plurality of PLV, each of the plurality of PLV conforming to a different PBR ridge profile.
- An embodiment wherein the PBA comprises an upper PBR and a lower PBR located on the PBB.
- An embodiment wherein the PLV comprises a void having peripheral edges comprising lines.
- An embodiment wherein the PLV comprises a void having peripheral edges comprising arcs.
- An embodiment wherein the PLV comprises a void having peripheral edges comprising lines and arcs.
- An embodiment wherein the PLH and the PLB comprises a material selected from a group consisting of: nylon (polyamide fibers that contain 0.11 polyamide); polyamide; polyoxymethylene (POM); acetal resin; and plastic.
- An embodiment wherein the PLA is selected from a group consisting of push bar models manufactured by SARGEANT, the group consisting of: AD8600 SERIES; KP SERIES; 5300 SERIES; 8500 SERIES; 8700 SERIES; 8800 SERIES; SURFACE VERTICAL ROD SERIES; and KEYPAD 80 SERIES.
- An embodiment wherein the PLA is selected from a group consisting of push bar models manufactured by CORBIN RUSSWIN, the group consisting of: PED4000 SERIES; PED5000 SERIES; ED2000 SERIES; ED4000 SERIES; ED5000 SERIES; and FE400S SERIES.
- An embodiment wherein the PLA is selected from a group consisting of push bar models manufactured by ASSA ABLOY YALE, the group consisting of: 7000 SERIES; 7100 (F) SERIES; 7200 SERIES; 7200 (F) SERIES; 7200M SERIES; and 7200M (F) SERIES.
- An embodiment wherein the PLA is selected from a group consisting of push bar models manufactured by VON DUPRIN, the group consisting of: 98 SERIES; and 99 SERIES.

One skilled in the art will recognize that other embodiments are possible based on combinations of elements taught within the above invention description.

CONCLUSION

A panic bar latch (PBL) system and method has been disclosed that provides for the temporary functional disablement of a panic bar assembly (PBA) that controls passage through a door and associated door frame. The PBL system utilizes a panic latch handle (PLH) coupled to a panic latch body (PLB). The PLB incorporates a panic latch void (PLV) that is configured to mechanically conform and couple (MCC) to a panic bar base (PBB) on a PBA via a panic bar ridge (PBR) located on the PBB. A panic latch edge (PLE) on the PLB rests on the PPB when the MCC is engaged. The MCC prevents the PPB from being depressed or released by maintaining a fixed separation between the PPB and the PBB. The MCC may occur using either an upper PBR or a lower PBR located on the PBB. The PBL may be configured with multiple PLV having different void profiles so as to enable MCC of the PBL with a variety of PBR ridge profiles.

CLAIMS INTERPRETATION

The following rules apply when interpreting the CLAIMS of the present invention:

- The CLAIM PREAMBLE should be considered as limiting the scope of the claimed invention.
- "WHEREIN" clauses should be considered as limiting the scope of the claimed invention.
- "WHEREBY" clauses should be considered as limiting the scope of the claimed invention.
- "ADAPTED TO" clauses should be considered as limiting the scope of the claimed invention.
- "ADAPTED FOR" clauses should be considered as limiting the scope of the claimed invention.
- The term "MEANS" specifically invokes the means-plus-function claims limitation recited in 35 U.S.C. § 112 (f) and such claim shall be construed to cover the corresponding structure, material, or acts described in the specification and equivalents thereof.
- The phrase "MEANS FOR" specifically invokes the means-plus-function claims limitation recited in 35 U.S.C. § 112 (f) and such claim shall be construed to cover the corresponding structure, material, or acts described in the specification and equivalents thereof.
- The phrase "STEP FOR" specifically invokes the step-plus-function claims limitation recited in 35 U.S.C. § 112 (f) and such claim shall be construed to cover the corresponding structure, material, or acts described in the specification and equivalents thereof.
- The step-plus-function claims limitation recited in 35 U.S.C. § 112 (f) shall be construed to cover the corresponding structure, material, or acts described in the specification and equivalents thereof ONLY for such claims including the phrases "MEANS FOR", "MEANS", or "STEP FOR".
- The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, S/N 11/565,411, ("' and/or' covers embodiments having element A alone, B alone, or elements A and B taken together") . . . . The claims presented herein are to be interpreted in light of the specification and drawings presented herein with sufficiently narrow scope such as to not preempt any abstract idea.
- The claims presented herein are to be interpreted in light of the specification and drawings presented herein with sufficiently narrow scope such as to not preclude every application of any idea.
- The claims presented herein are to be interpreted in light of the specification and drawings presented herein with sufficiently narrow scope such as to preclude any basic mental process that could be performed entirely in the human mind.
- The claims presented herein are to be interpreted in light of the specification and drawings presented herein with sufficiently narrow scope such as to preclude any process that could be performed entirely by human manual effort.

What is claimed is:

1. A panic bar latch (PBL) system for disabling the operation of a panic push bar of a panic bar assembly (PBA) of an exit door latch assembly, the panic bar latch (PBL) comprising:

(a) panic latch handle (PLH); and (b) panic latch body (PLB);

wherein:

said PLH is integrally mechanically coupled to said PLB;

said PLH comprises an open handle void (OHV) configured for receiving a user's hand for operating the PLH;

said PLB comprises a panic latch void (PLV) that is configured to mechanically conform and couple (MCC) to a panic bar base (PBB) on a panic bar assembly (PBA) via a panic bar ridge (PBR) located on said PBB;

said PBA is mechanically coupled to a door and controls passage through a door frame in which said door is attached via a door latching assembly;

said PBL is configured to temporary disable function of said panic bar assembly (PBA) and prevents a panic push bar (PPB) on said PBA from being depressed or released when said PBL is installed on said PBB by placing said PBR within said PLV, such that the PBL blocks movement of the PPB; and said PBL temporary disables function of said panic bar assembly (PBA) by maintaining a fixed separation between said PPB and said PBB of said PBA when said PBL is installed on said PBB by placing said PBR within said PLV.

2. The system of claim 1 wherein said PLB is configured with a plurality of PLV, each of said plurality of PLV conforming to a different PBR ridge profile.

3. The system of claim 1 wherein said PBA comprises an upper PBR and a lower PBR located on said PBB.

4. The system of claim 1 wherein said PLV comprises a void having peripheral edges comprising lines.

5. The system of claim 1 wherein said PLV comprises a void having peripheral edges comprising arcs.

6. The system of claim 1 wherein said PLV comprises a void having peripheral edges comprising lines and arcs.

7. The system of claim 1 wherein said PLH and said PLB comprises a material selected from a group consisting of: nylon (polyamide fibers that contain 0.11 polyamide); polyamide; polyoxymethylene (POM); acetal resin; and plastic.

8. The system of claim 1 wherein said PBA is selected from a group consisting of push bar models manufactured by SARGEANT, said group consisting of: AD8600 SERIES; KP SERIES; 5300 SERIES; 8500 SERIES; 8700 SERIES; 8800 SERIES; SURFACE VERTICAL ROD SERIES; and KEYPAD 80 SERIES.

9. The system of claim 1 wherein said PBA is selected from a group consisting of push bar models manufactured by CORBIN RUSSWIN, said group consisting of: PED4000 SERIES; PED5000 SERIES; ED2000 SERIES; ED4000 SERIES; ED5000 SERIES; and FE400S SERIES.

10. The system of claim 1 wherein said PBA is selected from a group consisting of push bar models manufactured by ASSA ABLOY YALE, said group consisting of: 7000 SERIES; 7100 (F) SERIES; 7200 SERIES; 7200 (F) SERIES; 7200M SERIES; and 7200M (F) SERIES.

11. A panic bar latch (PBL) method operating on a panic bar latch (PBL) system, for disabling the operation of a panic push bar of a panic bar assembly (PBA) of an exit door latch assembly, said panic bar latch system comprising:

(a) panic latch handle (PLH); and (b) panic latch body (PLB);

wherein:

said PLH is mechanically coupled to said PLB;

said PLH comprises an open handle void (OHV);

said PLB comprises a panic latch void (PLV) that is configured to mechanically conform and couple (MCC) to a panic bar base (PBB) on a panic bar assembly (PBA) via a panic bar ridge (PBR) located on said PBB;

said PBA is mechanically coupled to a door and controls passage through a door frame in which said door is attached;

said PBL temporary disables function of said panic bar assembly (PBA) and prevents a panic push bar (PPB) on said PBA from being depressed or released when said PBL is installed on said PBB by placing said PBR within said PLV; and said PBL temporary disables function of said panic bar assembly (PBA) by maintaining a fixed separation between said PPB and said PBB of said PBA when said PBL is installed on said PBB by placing said PBR within said PLV;

wherein said method comprises the steps of:

(1) forming a panic latch handle (PLH) and mechanically coupling the PLH to a panic latch body (PLB) (0201);

(2) forming a panic latch void (PLV) within the panic latch body (PLB) that conforms to a panic bar ridge (PBR) on a panic bar base (PBB) contained within a panic push bar assembly (PBA) (0202);

(3) mating the PBR with the PBV on the PLB (0203); and (4) separating a panic push bar (PPB) on said PBA from said PBB with said PLB so as to prevent activation of said PBA (0204).

12. The method of claim 11 wherein said PLB is configured with a plurality of PLV, each of said plurality of PLV conforming to a different PBR ridge profile.

13. The method of claim 11 wherein said PBA comprises an upper PBR and a lower PBR located on said PBB.

14. The method of claim 11 wherein said PLV comprises a void having peripheral edges comprising lines.

15. The method of claim 11 wherein said PLV comprises a void having peripheral edges comprising arcs.

16. The method of claim 11 wherein said PLV comprises a void having peripheral edges comprising lines and arcs.

17. The method of claim 11 wherein said PLH and said PLB comprises a material selected from a group consisting of: nylon (polyamide fibers that contain 0.11 polyamide); polyamide; polyoxymethylene (POM); acetal resin; and plastic.

18. The method of claim 11 wherein said PBA is selected from a group consisting of push bar models manufactured by SARGEANT, said group consisting of: AD8600 SERIES; KP SERIES; 5300 SERIES; 8500 SERIES; 8700 SERIES; 8800 SERIES; SURFACE VERTICAL ROD SERIES; and KEYPAD 80 SERIES.

19. The method of claim 11 wherein said PBA is selected from a group consisting of push bar models manufactured by CORBIN RUSSWIN, said group consisting of: PED4000 SERIES; PED5000 SERIES; ED2000 SERIES; ED4000 SERIES; ED5000 SERIES; and FE400S SERIES.

20. The method of claim 11 wherein said PBA is selected from a group consisting of push bar models manufactured by ASSA ABLOY YALE, said group consisting of: 7000 SERIES; 7100 (F) SERIES; 7200 SERIES; 7200 (F) SERIES; 7200M SERIES; and 7200M (F) SERIES.

* * * * *